(12) United States Patent
Yoshioka et al.

(10) Patent No.: US 12,448,488 B2
(45) Date of Patent: Oct. 21, 2025

(54) CONJUGATE OF BIO-RELATED SUBSTANCE AND BLOCK POLYMER, AND BLOCK POLYMER DERIVATIVE FOR OBTAINING SAID CONJUGATE

(71) Applicants: NOF CORPORATION, Tokyo (JP); UNIVERSITA' DEGLI STUDI DI PADOVA, Padua (IT)

(72) Inventors: Hiroki Yoshioka, Kawasaki (JP); Midori Hirai, Kawasaki (JP); Masaki Kamiya, Kawasaki (JP); Gianfranco Pasut, Padua (IT)

(73) Assignees: NOF CORPORATION, Tokyo (JP); UNIVERSITA' DEGLI STUDI DI PADOVA, Padua (IT)

( * ) Notice: Subject to any disclaimer, the term of this patent is extended or adjusted under 35 U.S.C. 154(b) by 1045 days.

(21) Appl. No.: 17/603,275

(22) PCT Filed: Apr. 15, 2019

(86) PCT No.: PCT/IT2019/000031
§ 371 (c)(1),
(2) Date: Oct. 12, 2021

(87) PCT Pub. No.: WO2020/213015
PCT Pub. Date: Oct. 22, 2020

(65) Prior Publication Data
US 2022/0185969 A1    Jun. 16, 2022

(51) Int. Cl.
| | |
|---|---|
| *A61K 31/765* | (2006.01) |
| *A61K 31/785* | (2006.01) |
| *A61K 38/27* | (2006.01) |
| *A61K 47/54* | (2017.01) |
| *A61K 47/56* | (2017.01) |
| *A61K 47/59* | (2017.01) |
| *C08G 81/00* | (2006.01) |
| *C08G 81/02* | (2006.01) |

(52) U.S. Cl.
CPC ........... *C08G 81/028* (2013.01); *A61K 38/27* (2013.01); *A61K 47/54* (2017.08); *A61K 47/595* (2017.08)

(58) Field of Classification Search
None
See application file for complete search history.

(56) References Cited

U.S. PATENT DOCUMENTS

| | | | |
|---|---|---|---|
| 5,824,784 A | 10/1998 | Kinstler et al. | |
| 2003/0171285 A1 | 9/2003 | Finn et al. | |
| 2007/0148125 A1* | 6/2007 | Kataoka | C08G 85/002 525/438 |
| 2009/0023859 A1 | 1/2009 | Sakanoue et al. | |

FOREIGN PATENT DOCUMENTS

| | | |
|---|---|---|
| CN | 108815523 A | 11/2018 |
| CN | 109550060 A | 4/2019 |
| JP | 2694923 B2 | 12/1997 |
| JP | 3268913 B2 | 3/2002 |
| JP | 3310000 B2 | 7/2002 |
| JP | 2011-105792 A | 6/2011 |
| JP | 2015-124162 A | 7/2015 |
| WO | WO 2005/000359 A2 | 1/2005 |
| WO | WO 2006/088248 A1 | 8/2006 |
| WO | WO 2014/084378 A1 | 6/2014 |
| WO | WO-2017170845 A1 * | 10/2017 |

OTHER PUBLICATIONS

Machine translation of WO-2017170845-A1 (no date).*
Erichsen et al.: "Methyl Group Metabolism in Differentiation, Aging, and Cancer". (Year: 2022).*
Kasai: "What causes human cancer? Approaches from the chemistry of DNA damage". (Year: 2016).*
Ahn et al., "Antibody fragment-conjugated polymeric micelles incorporating platinum drugs for targeted therapy of pancreatic cancer," *Biomaterials*, 39: 23-30 (2015).
Chang et al., "Permselectivity of the glomerular capillary wall: III. Restricted transport of polyanions," *Kidney Int.*, 8(4): 212-218 (1975).
Rennke et al., "Glomerular filtration of proteins: Clearance of anionic, neutral, and cationic horseradish peroxidase in the rat," *Kidney Int.*, 13(4): 278-288 (1978).
European Patent Office, International Search Report in International Patent Application No. PCT/IT2019/000031 (Jan. 8, 2020).
Japan Patent Office, Notice of Reasons for Refusal in Japanese Patent Application No. 2021-559941 (Oct. 25, 2022).

* cited by examiner

*Primary Examiner* — Michael J Feely
(74) *Attorney, Agent, or Firm* — Leydig, Voit & Mayer, Ltd.

(57) ABSTRACT

The invention provides a modified bio-related substance that shows further prolonged half-life in blood and further improved stability in the blood of living organisms. In particular, the invention provides a conjugate of a block polymer and a bio-related substance, which conjugate is represented by the following formula (I), wherein each symbol is as described herein.

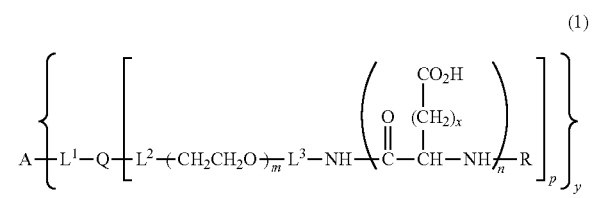

10 Claims, 9 Drawing Sheets
Specification includes a Sequence Listing.

40,634 Da (A)

(B)

CONJUGATE OF BIO-RELATED SUBSTANCE AND BLOCK POLYMER, AND BLOCK POLYMER DERIVATIVE FOR OBTAINING SAID CONJUGATE

INCORPORATION-BY-REFERENCE OF MATERIAL ELECTRONICALLY SUBMITTED

Incorporated by reference in its entirety herein is a computer-readable nucleotide/amino acid sequence listing submitted concurrently herewith and identified as follows: 3,641 bytes ASCII (Text) file named "757933 SequenceListing.txt," created Oct. 8, 2021.

TECHNICAL FIELD OF THE INVENTION

The present invention relates to a conjugate of a bio-related substance and an anionic block polymer, and a block polymer derivative for obtaining the aforementioned conjugate.

BACKGROUND OF THE INVENTION

When pharmaceutical products using bio-related substances such as hormones, cytokines, antibodies, enzymes and the like are administered into the body, they are generally eliminated rapidly from the body by glomerular filtration in the kidney and uptake by macrophages in the liver, spleen, and the like. Therefore, they have a short half-life in the blood and sufficient pharmacological effects are often difficult to obtain.

To solve such problem, attempts have been made to chemically modify bio-related substances with sugar chains, hydrophilic polymers such as polyethylene glycol, albumin, and the like. As a result, it has become possible to prolong the blood half-life of bio-related substances by increasing molecular weight, forming a hydration layer, and the like.

It is also well known that effects such as reduced toxicity and reduced antigenicity of bio-related substances, and improved solubility of hardly water-soluble drugs and the like are afforded by modifying with polyethylene glycol.

A bio-related substance modified with polyethylene glycol is covered by a hydration layer formed by hydrogen bonding of the ether bond of polyethylene glycol and water molecules, and has an increased molecular size. As a result, it can avoid glomerulus filtration in the kidney. It is further known that an interaction of the substance with opsonin or surface of the cells constituting each tissue decreases, which in turn decreases migration into each tissue.

Polyethylene glycol is an excellent material that can prolong half-life in blood of bio-related substances. Many researches of the bio-related substances modified with polyethylene glycol have been performed, and the results showing significantly prolonged half-life in blood thereof have been obtained.

However, a new material capable of further prolonging the half-life in blood is demanded.

As other method for prolonging the half-life in blood of a bio-related substance, a method for applying negative charge to the bio-related substance can be mentioned. Negatively charged glycocalyx is present in glomerular capillary wall of kidney. Thus, it is known that elimination of molecules with multiple negative charges from glomeruli is suppressed by electrostatic repulsion with glycocalyx.

Non-patent document 1 reports that elimination of enzyme peroxidase from the kidney was significantly suppressed when the enzyme was negatively charged. In non-patent document 2, it was confirmed that elimination of dextran polymer from the kidney was suppressed when the polymer was negatively charged.

To prolong half-life in blood of a bio-related substance, if there is a material having both a molecular size-increasing effect by modification with polyethylene glycol and a negative charge-imparting effect, a further extension of the half-life in blood of a bio-related substance is expected. There are several methods for imparting a negative charge to polyethylene glycol derivatives. A block polymer combining polyethylene glycol and an anionic polyamino acid is considered as a method capable of efficiently introducing multiple negative charges into polyethylene glycol. Application examples of a general block polymer of polyethylene glycol and an anionic polyamino acid include the following.

For example, patent document 1 describes a water-soluble polymer drug in which a hydrophobic drug is conjugated to a block polymer of polyethylene glycol, polysaccharide, polyacrylamide or the like, and polyamino acid such as polyaspartic acid and the like. Patent document 2 describes a water-soluble polymer anti-cancer agent in which an anti-cancer agent is conjugated to a block polymer of polyethylene glycol and polyglutamic acid. Patent document 3 describes a carrier of a drug, which is composed of a block polymer of polyethylene glycol and polyaspartic acid or polyglutamic acid.

The block polymers described in the above-mentioned patent documents generally form a polymeric micelle by self-association and are used for delivery of a drug incorporated inside the micelle. The carboxyl group present in the side chain of polyamino acid moiety of a block polymer is utilized to covalently conjugate the drug, and incorporated into the inside of the micelle when the polymeric micelle is formed. Therefore, excretion from the kidney is not suppressed even though the carboxyl group in the polyamino acid moiety is negatively charged. In addition, since these block polymers do not have a functional group other than the carboxyl group in the polyamino acid moiety, they cannot modify bio-related substances. Moreover, since the aforementioned block polymers form a micelle in an aqueous solution, they are not suitable for modification of bio-related substances.

Therefore, a modified bio-related substance is demanded, which shows further prolonged half-life in blood and further improved stability in the blood of living organisms.

DOCUMENT LIST

Patent Documents

[patent document 1] JP-B-2694923
[patent document 2] JP-B-3310000
[patent document 3] JP-B-3268913

Non-Patent Documents

[non-patent document 1] H. G. Rennke, Y. Patel, M. A. Venkatachalam; Kidney Int. 13 (1978) 278-288
[non-patent document 2] R. L. S. Chang, W. M. Deen, C. R. Robertson, B. M. Brenner; Kidney Int. 8 (1975) 212-218

SUMMARY OF THE INVENTION

Problems to be Solved by the Invention

Thus, a problem of the present invention is to provide a bio-related substance modified with an anionic block polymer, which shows further prolonged half-life in blood and further improved stability in the blood of living organisms. More specifically, the present invention aims to provide a bio-related substance modified with a block polymer derivative of anionic polyamino acid and hydrophilic polyethylene glycol, which shows improved stability in the blood of living organisms.

Means of Solving the Problems

The present inventors have conducted intensive studies in an attempt to solve the aforementioned problem and found that the half-life in blood of a bio-related substance can be further prolonged and the stability thereof in the blood of living organisms can be improved by providing a conjugate of the bio-related substance and a block polymer derivative of anionic polyamino acid and hydrophilic polyethylene glycol, which resulted in the completion of the present invention.

That is, the present invention is as shown below.

[1] A conjugate of a block polymer and a bio-related substance, which conjugate is represented by the following formula (1):

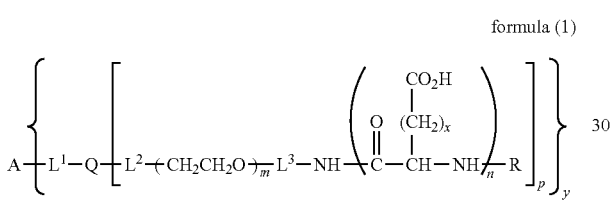

formula (1)

wherein A is a bio-related substance, $L^1$, $L^2$, $L^3$ are each independently a single bond or a divalent linker, Q is a residue of a compound having 2 or 3 active hydrogens, m is 10-1400, n is 2-100, x is 1 or 2, R is a hydrogen atom or an acyl group, p is 1 or 2, and y is 1-40.

[2] The conjugate of [1], wherein, in the formula (1), y is 1.

[3] The conjugate of [1] or [2], wherein, in the formula (1), m is 40-1200 and n is 5-50.

[4] The conjugate of any of [1] to [3], wherein, in the formula (1), Q is a residue of a compound selected from the group consisting of ethylene glycol, glycerol, lysine, aspartic acid and glutamic acid.

[5] The conjugate of any of [1] to [4], wherein, in the formula (1), $L^1$, $L^2$, $L^3$ are each independently selected from the group consisting of a single bond, a phenylene group, an amide bond, an ether bond, a thioether bond, a urethane bond, a secondary amino group, a carbonyl group, a urea bond, a triazine group, a maleimide group added with thiol, an oxyme bond, and an alkylene group optionally containing one or more kinds selected from the group consisting of a single bond, a phenylene group, an amide bond, an ether bond, a thioether bond, a urethane bond, a secondary amino group, a carbonyl group, a urea bond, a triazine group, a maleimide group added with thiol and an oxyme bond.

[6] The conjugate of any of [1] to [5], wherein, in the formula (1), A is a bio-related substance selected from the group consisting of cytokine, hormone, enzyme, antibody and nucleic acid.

[7] A block polymer derivative represented by the following formula (2) which is an intermediate for obtaining the conjugate of any of [1] to [6]:

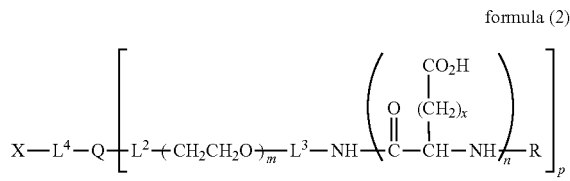

formula (2)

wherein X is a functional group chemically reactive with a bio-related substance, $L^2$, $L^3$, $L^4$ are each independently a single bond or a divalent linker, Q is a residue of a compound having 2 or 3 active hydrogens, m is 10-1400, n is 2-100, x is 1 or 2, R is a hydrogen atom or an acyl group, and p is 1 or 2.

[8] The block polymer derivative of [7], wherein, in the formula (2), Q is a residue of a compound selected from the group consisting of ethylene glycol, glycerol, lysine, aspartic acid and glutamic acid.

[9] The block polymer derivative of [7] or [8], wherein, in the formula (2), $L^2$, $L^3$, $L^4$ are each independently selected from the group consisting of a single bond, a phenylene group, an amide bond, an ether bond, a thioether bond, a urethane bond, a secondary amino group, a carbonyl group, a urea bond, and an alkylene group optionally containing one or more kinds selected from the group consisting of a single bond, a phenylene group, an amide bond, an ether bond, a thioether bond, a urethane bond, a secondary amino group, a carbonyl group and a urea bond.

[10] The block polymer derivative of any of [7] to [9], wherein, in the formula (2), X is a reactive functional group selected from the group consisting of an active ester group, an active carbonate group, an aldehyde group, an isocyanate group, an isothiocyanate group, an epoxy group, a carboxyl group, a thiol group, a maleimide group, a substituted maleimide group, a hydrazide group, a pyridyldithio group, a substituted sulfo group, an amino group, an oxyamino group, an iodoacetamido group, an alkylcarbonyl group, an alkenyl group, an alkynyl group, an azido group, an acryloyl group, a sulfonyloxy group, an α-haloacetyl group, an allyl group and a vinyl group.

Effect of the Invention

According to the present invention, a bio-related substance modified with an anionic block polymer can be obtained.

The above-mentioned modified bio-related substance shows a prolonged half-life in blood and improved stability in the blood of living organisms due to a molecular size-increasing effect by polyethylene glycol constituting the block polymer and a negative charge-imparting effect by anionic polyamino acid.

DESCRIPTION OF EMBODIMENTS

Figure 1:
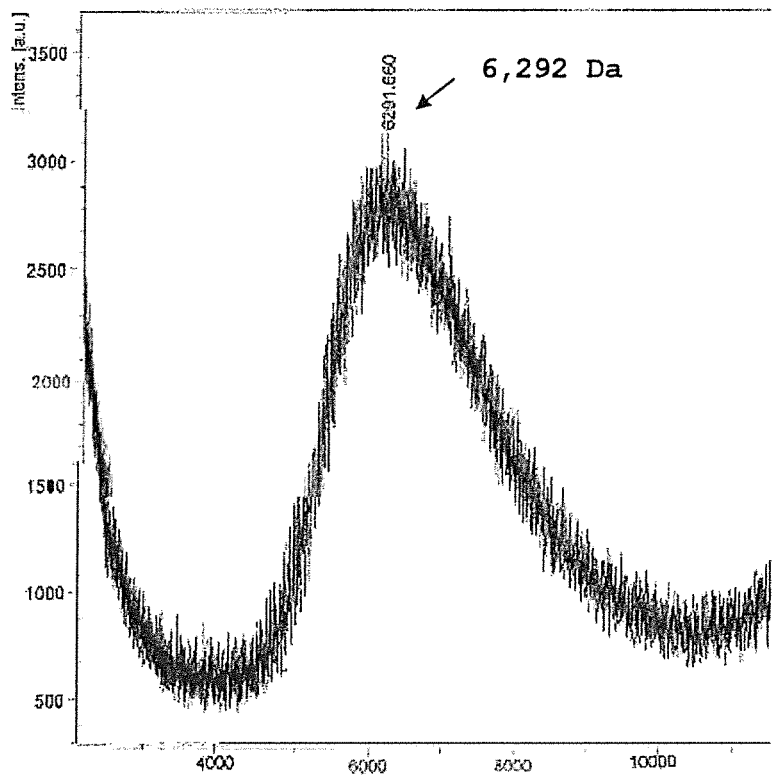
FIG. 1 shows the results of MALDI-TOF-MS analysis of block polymer derivative (18) in Example 1 (2).

The present invention is explained in detail in the following.

The present invention provides a conjugate of an anionic block polymer and a bio-related substance (hereinafter sometimes to be also referred to as "the conjugate of the present invention" in the present specification).

The conjugate of the present invention is formed by binding a bio-related substance to a block polymer derivative in which polyethylene glycol is bonded to polyamino acid directly or via a linker, and is shown by the following formula (1):

formula (1)

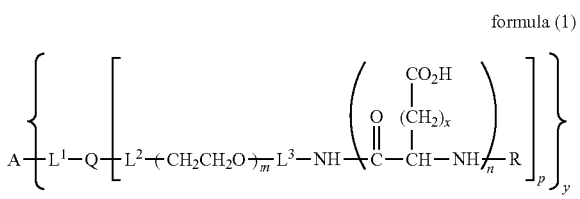

wherein A is a bio-related substance, $L^1$, $L^2$, $L^3$ are each independently a single bond or a divalent linker, Q is a residue of a compound having 2 or 3 active hydrogens, m is 10-1400, n is 2-100, x is 1 or 2, R is a hydrogen atom or an acyl group, p is 1 or 2 and y is 1-40.

In the formula (1), m shows the degree of polymerization of ethylene glycol, and is generally 10-1400, preferably 40-1200, further preferably 100-1000.

In the formula (1), n shows the degree of polymerization of amino acid, and is generally 2-100, preferably 5-50, further preferably 5-30.

The ratio of the degree of polymerization of ethylene glycol and the degree of polymerization of amino acid (m/n) in the formula (1) is generally 1-500, preferably 2-240, further preferably 5-200.

When the m/n value is smaller than 1, or when the degree of polymerization of ethylene glycol is smaller than the degree of polymerization of amino acid, the molecular size-increasing effect by polyethylene glycol may not be obtained sufficiently. When the m/n value is higher than 500, or when the degree of polymerization of amino acid is small, the negative charge-imparting effect by anionic polyamino acid may not be obtained sufficiently.

In the formula (1), x is 1 or 2. When x is 1, the amino acid constituting the polyamino acid moiety in the formula (1) is aspartic acid and, when x is 2, the amino acid constituting the polyamino acid moiety in the formula (1) is glutamic acid.

As the amino acid constituting the polyamino acid moiety, glutamic acid (in the formula (1), x=2) is more preferable.

The amino acid constituting the polyamino acid moiety may be any of L form, D form, and DL form, and L form is more preferable.

In the formula (1), a group represented by R is a hydrogen atom or an acyl group, preferably an acyl group.

As acyl group, saturated acyl group having a carbon number of 2-4 is preferable. Specific examples include acetyl group, propionyl group and the like, and acetyl group is preferable.

The total molecular weight of the block polymer derivative forming the conjugate of the present invention is generally 5,000-100,000, preferably 10,000-80,000, further preferably 20,000-60,000. As used herein, the molecular weight refers to a number average molecular weight (Mn) measured and calculated by gel permeation chromatography.

In the present invention, the above-mentioned block polymer derivative and the bio-related substance are bonded via a compound having 2 or 3 active hydrogens, or via the aforementioned compound and a divalent linker.

Therefore, in the formula (1), Q is a residue of a compound having 2 or 3 active hydrogens.

As used herein, the "active hydrogen" refers to hydrogen with high reactivity from the intramolecular hydrogens of the organic compound and, for example, hydrogens of groups such as hydroxyl group, carboxyl group, amino group, thiol group and the like can be mentioned. In the present invention, active hydrogen of a primary amino group is counted as one.

In the present invention, a compound having 2 or 3 active hydrogens is, for example, preferably ethylene glycol, glycerol, lysine, aspartic acid, glutamic acid or the like, more preferably ethylene glycol or glycerol.

Thus, as "a residue of a compound having two active hydrogens", a residue of ethylene glycol and the like can be mentioned. As "a residue of a compound having three active hydrogens", a residue such as glycerol, lysine, aspartic acid, glutamic acid and the like can be mentioned.

In the conjugate of the present invention, when p in the formula (1) is 1, the block polymer derivative moiety in the conjugate of the present invention is of a straight chain type and, when p is 2, the block polymer derivative moiety in the conjugate of the present invention is of a 2 branched chain type.

In the conjugate of the present invention, the number of the block polymer derivatives that bind to the bio-related substance is shown by y in the formula (1) and is generally 1-40, preferably 1-20, more preferably 1-10. The effects achieved by increasing the number y of the block polymer derivatives that bind to the bio-related substance include prolongation of the half-life in blood, a decrease in antigenicity and the like. When the binding amount of the block polymer derivatives becomes high, the activity may decrease depending on the kind of the bio-related substance. When such bio-related substance is used, the number y of the block polymer derivative molecule is preferably set to 1.

It is known that the activity of bio-related substances such as enzyme and the like does not decrease even when a plurality of polymer derivatives are bonded.

In the formula (1), $L^1$, $L^2$, $L^3$ are each independently a single bond or a divalent linker. They are not particularly limited as long as they are bonds or groups capable of forming a covalent bond. Preferred is a single bond, a phenylene group, an amide bond, an ether bond, a thioether bond, a urethane bond, a secondary amino group, a carbonyl group, a urea bond, a triazine group, a maleimide group added with thiol, an oxyme bond, or an alkylene group optionally containing one or more kinds selected from the group consisting of the aforementioned bonds and groups, more preferred is a single bond, an amide bond, an ether bond, a thioether bond, a urethane bond, a secondary amino group, a triazine group, a maleimide group added with thiol, an oxyme bond, or a group formed by binding one or more kinds selected from the group consisting of the aforementioned bonds and groups to one or two alkylene groups, and a particularly preferable embodiment is shown by the following group (I). Ester bond and carbonate bond are not suitable since they are gradually decomposed in the blood of living organisms.

Group (I):

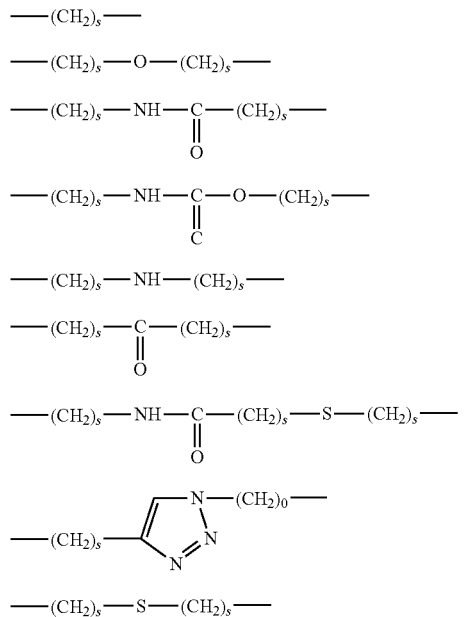

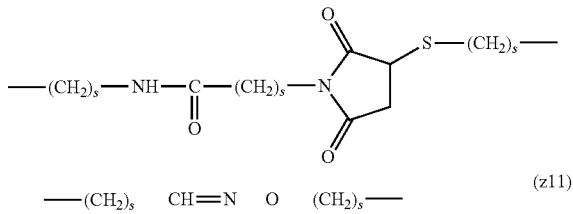

In linkers (z1)-(z11) in group (I), s in the formula is an integer of 0-10, preferably 0-6, further preferably 0-3. In linkers (z2)-(z11), two s in the formula may be the same or different.

In the formula (1), the linker for $L^1$ is preferably (z3), (z4), (z5), (z6), (z7), (z8), (z10) or (z11) in the above-mentioned group (I), more preferably (z3), (z4), (z5), (z6), (z10) or (z11), particularly preferably (z3), (z5) or (z10).

In the formula (1), the linker for $L^2$ or $L^3$ is preferably (z1), (z2), (z3), (z4), (z5), (z6) or (z9), more preferably (z1), (z2), (z3), (z4) or (z6), in the above-mentioned group (I).

In the formula (1), the bio-related substance for A is not particularly limited as long as it is a substance relating to diagnosis, treatment or prophylaxis of diseases in human or other animals. Specifically protein, peptide, nucleic acid, cell, virus and the like can be mentioned, and protein, peptide or nucleic acid is preferably used.

Examples of the protein or peptide include cytokine, growth factor, blood coagulation factor, hormone, antibody, antibody fragment, enzyme and the like.

More specifically, examples of the cytokine include interferon type I, type II, type III, interleukin, lymphokine that modulate immunity; erythropoietin and granulocyte colony stimulating factor (GCSF) as hematopoiesis factors; epidermal growth factor (EGF), fibroblast growth factor (FGF), platelet-derived growth factor (PDGF), hepatocyte growth factor (HGF), transforming growth factor (TGF) that are cell growth factors; tumor necrosis factor (TNF-α) and lymphotoxin (TNF-β) as cell injury factors; adipokine; nerve growth factor (NGF) as a neurotrophic factor; receptor antagonists thereof and the like.

Examples of the growth factor include insulin-like growth factor (IGF), transforming growth factor (TGF), thrombopoietin, bone morphogenic protein (BMP) and the like.

Examples of the blood coagulation factor include fibrinogen, fibrin, blood coagulation factor V, factor VII, factor VIII, factor IX, factor X, factor XII and the like.

Examples of the hormone include calcitonin, insulin, analogues thereof, glucagon-like peptide (GLP-1), exenatide (GLP-1 receptor agonist), somatostatin, human growth hormone and the like.

Examples of the antibody include full-length antibody, and Fab, svFV, nanobody and the like as an antibody fragment.

Examples of the enzyme include asparaginase, superoxide dismutase, uric acid oxydase and the like.

These proteins show low stability in blood, and prolongation of half-life in blood is expected by modifying into the conjugate of the present invention.

In the present invention, as protein, interferon, interleukin, erythropoietin, GCSF, blood coagulation factor VIII, blood coagulation factor IX, human growth hormone, or antibody fragment is preferably used, human growth hormone, interferon, GCSF, erythropoietin, or antibody fragment (particularly Fab) is more preferably used, and human growth hormone or GCSF is further preferably used.

In the present invention, as peptide, insulin, bivalirudin, teriparatide, exenatide, enfuvirtide, degarelix, mifamurtide, nesiritide, goserelin, glatiramer, octreotide, lanreotide, icatibant, ziconotide, pramlintide, romiplostim, calcitonin, oxytocin, leuprorelin or glucagon is preferably used, insulin, exenatide or calcitonin is more preferably used.

Examples of the nucleic acid include, but are not limited to, DNA, RNA, chimeric nucleic acids of RNA, DNA/RNA hybrid, aptamer, siRNA, microRNA, antisense RNA and the like.

The nucleic acid may be any one of 1 to 3 strands, and preferably single strand or double strand.

The nucleic acid used in the present invention may be other type of nucleotide (e.g., N-glycoside of purine or pyrimidine base and sugar other than ribose, deoxyribose etc.), or oligomer having a non-nucleotide skeleton (e.g., commercially available peptide nucleic acid (PNA) etc.) or the like. Furthermore, the nucleic acid may be, for example, nucleic acid added with known modification, nucleic acid with a label known in the field, nucleic acid added with a cap, methylated nucleic acid, nucleic acid in which one or more natural nucleotides are substituted by analogs or the like.

More preferable nucleic acid is, for example, an aptamer that acts in the blood.

A preferable embodiment of the conjugate of the present invention is, for example, a conjugate of the formula (1) wherein the number y of the block polymer derivative that binds to the bio-related substance A is 1, that is, a conjugate in which one molecule of the block polymer derivative is bonded to the bio-related substance A.

Such conjugate is represented by the following formula (1') and is preferable as a modified form of a bio-related substance whose activity may decrease due to an increase in the number of block polymer derivative molecules, as mentioned above.

formula (1')

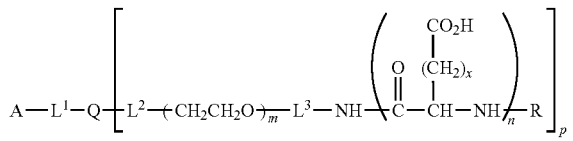

wherein A is a bio-related substance, $L^1$, $L^2$, $L^3$ are each independently a single bond or a divalent linker, Q is a residue of a compound having 2 or 3 active hydrogens, m is 10-1400, n is 2-100, x is 1 or 2, R is a hydrogen atom or an acyl group, and p is 1 or 2.

The present invention also provides an intermediate for producing the above-mentioned conjugate of the present invention (hereinafter to be also referred to as "the intermediate of the present invention" in the present specification).

The intermediate of the present invention is a block polymer derivative shown by the following formula (2):

formula (2)

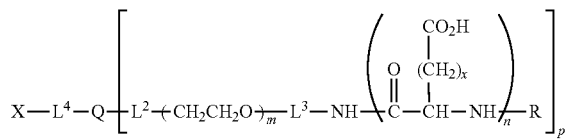

wherein X is a functional group chemically reactive with a bio-related substance, $L^2$, $L^3$, $L^4$ are each independently a single bond or a divalent linker, Q is a residue of a compound having 2 or 3 active hydrogens, m is 10-1400, n is 2-100, x is 1 or 2, R is a hydrogen atom or an acyl group, and p is 1 or 2.

In the intermediate of the present invention, in the formula (2), the degree of polymerization of ethylene glycol for m, the degree of polymerization of amino acid for n, the total molecular weight of the block polymer derivative, the divalent linker for $L^2$ or $L^3$, the residue for Q, x, group represented by R, and p are as mentioned above for the conjugate of the present invention.

In the formula (2), $L^4$ is a single bond or a divalent linker, and is the same as $L^2$, $L^3$ in the conjugate of the present invention.

In the formula (2), the functional group for X is not particularly limited as long as it can react with a functional group present in a bio-related substance to be the target of chemical modification, for example, protein, peptide, antibody, nucleic acid and the like having physiological activity, a functional group such as amino group, thiol group, aldehyde group, carboxyl group, unsaturated bond, azido group and the like, and form a covalent bond.

For example, the functional groups described in "Harris, J. M. Poly(Ethylene Glycol) Chemistry; Plenum Press: New York, 1992", "Hermanson, G. T. Bioconjugate Techniques, 2nd ed.; Academic Press: San Diego, CA, 2008" and "PEGylated Protein Drugs: Basic Science and Clinical Applications; Veronese, F. M., Ed.; Birkhauser: Basel, Switzerland, 2009" and the like can be mentioned.

In the formula (2), the "functional group capable of reacting with bio-related substance" for X specifically includes, for example, an active ester group, an active carbonate group, an aldehyde group, an isocyanate group, an isothiocyanate group, an epoxy group, a carboxyl group, a thiol group, a maleimide group, a substituted maleimide group, a hydrazide group, a pyridyldithio group, a substituted sulfo group, an amino group, an oxyamino group, an iodoacetamido group, an alkylcarbonyl group, an alkenyl group, an alkynyl group, an azido group, an acryloyl group, a sulfonyloxy group, an α-haloacetyl group, an allyl group, a vinyl group and the like.

In the above, the active ester group is an ester group having a highly removable alkoxy group. Examples of the highly removable alkoxy group include alkoxy groups induced from nitrophenol, N-hydroxysuccinimide, pentafluorophenol and the like. As the active ester group, an ester group having an alkoxy group induced from N-hydroxysuccinimide is preferable.

In the above, the active carbonate group is a carbonate group having a highly removable alkoxy group. Examples of the highly removable alkoxy group include alkoxy groups induced from nitrophenol, N-hydroxysuccinimide, pentafluorophenol and the like. As the active carbonate group, a carbonate group having an alkoxy group induced from nitrophenol or N-hydroxysuccinimide is preferable.

In the above, the substituted maleimide group is a maleimide group in which one hydrogen atom bonded to a carbon atom at one end of the double bond of the maleimide ring is substituted by a hydrocarbon group. Specific examples of the hydrocarbon group include a methyl group, an ethyl group, a propyl group, an isopropyl group, a butyl group, a tertiary butyl group and the like, and a methyl group or an ethyl group is preferable.

In the above, the substituted sulfo group is a group in which the hydroxyl group of the sulfo group is substituted by a hydrocarbon group which may contain a fluorine atom. Specific examples of the hydrocarbon group which may contain a fluorine atom include a methyl group, an ethyl group, a propyl group, an isopropyl group, a butyl group, a tertiary butyl group, a hexyl group, a nonyl group, a vinyl group, a phenyl group, a benzyl group, a 4-methylphenyl group, a trifluoromethyl group, a 2,2,2-trifluoroethyl group, a 4-(trifluoromethoxy)phenyl group and the like, and a methyl group, a vinyl group, a 4-methylphenyl group or a 2,2,2-trifluoroethyl group is preferable.

As the functional group for X, an active ester group, an active carbonate group, an aldehyde group, an isocyanate group, an isothiocyanate group, an epoxy group, a carboxyl group, a thiol group, a maleimide group, a hydrazide group, a pyridyldithio group, a vinylsulfo group (sulfo group substituted by vinyl group), an amino group, an oxyamino group, an alkynyl group, an azido group, an acryloyl group, a sulfonyloxy group, an α-haloacetyl group, an allyl group or a vinyl group is preferable, an active ester group, an active carbonate group, an aldehyde group, a maleimide group or an amino group is more preferable, and an aldehyde group or an amino group is particularly preferable.

In a preferable embodiment of the present invention, the functional groups for X in the formula (2) can be divided into the following group (II), group (III), group (IV), group (V), group (VI) and group (VII).

Group (II): Functional Groups Capable of Reacting with Amino Group Possessed by Bio-Related Substance
  (a), (b), (c), (d), (e), (f), (g), (j), (k) described below
Group (III): Functional Groups Capable of Reacting with Thiol Group Possessed by Bio-Related Substance
  (a), (b), (c), (d), (e), (f), (g), (h), (i), (j), (k), (l) described below
Group (IV): Functional Groups Capable of Reacting with Aldehyde Group Possessed by Bio-Related Substance
  (h), (m), (n), (p) described below
Group (V): Functional Groups Capable of Reacting with Carboxyl Group Possessed by Bio-Related Substance
  (h), (m), (n), (p) described below
Group (VI): Functional Groups Capable of Reacting with Unsaturated Bond Possessed by Bio-Related Substance
  (h), (m), (o) described below
Group (VII): Functional Groups Capable of Reacting with Azido Group Possessed by Bio-Related Substance
  (l) described below

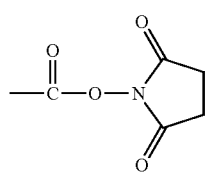
(a)

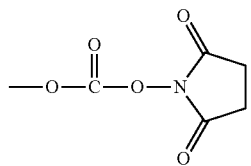
(b)

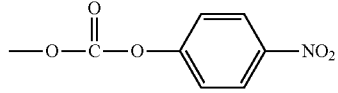
(c)

(d)

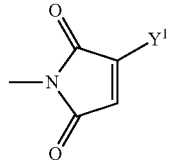
(e)

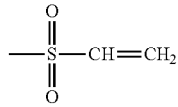
(f)

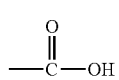
(g)

—SH (h)

(i)

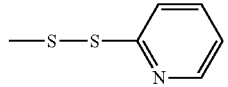
(j)

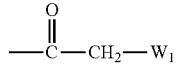
(k)

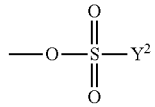
(l)

—NH$_2$ (m)

—ONH$_2$ (n)

—N$_3$ (o)

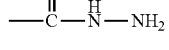
(p)

In functional group (j), $W_1$ in the formula is a halogen atom such as a chlorine atom (Cl), a bromine atom (Br), an iodine atom (I) or the like, preferably a bromine atom or an iodine atom, and more preferably an iodine atom.

In functional group (e) and functional group (l), $Y^1$ and $Y^3$ in the formula are each independently a hydrogen atom or a hydrocarbon group having a carbon number of 1-5, preferably a hydrocarbon group having a carbon number of 1-5.

Specific examples of the hydrocarbon group having a carbon number of 1-5 include a methyl group, an ethyl group, a propyl group, an isopropyl group, a butyl group, a tertiary butyl group and the like, preferably a methyl group or an ethyl group.

In functional group (k), $Y^2$ in the formula is a hydrocarbon group having a carbon number of 1-10 and optionally containing a fluorine atom. Specific examples thereof include a methyl group, an ethyl group, a propyl group, an isopropyl group, a butyl group, a tertiary butyl group, a hexyl group, a nonyl group, a vinyl group, a phenyl group, a benzyl group, a 4-methylphenyl group, a trifluoromethyl group, a 2,2,2-trifluoroethyl group, a 4-(trifluoromethoxy) phenyl group and the like. Preferred are a methyl group, a vinyl group, a 4-methylphenyl group and a 2,2,2-trifluoroethyl group.

In the formula (2), the functional group for X is preferably (a), (b), (c), (d), (e), (m), (n) or (o), more preferably (d), (e) or (m), particularly preferably (d) or (m).

The block polymer derivative as an intermediate in the above-mentioned present invention has a structure in which hydrophilic polyethylene glycol and hydrophilic polyamino acid are conjugated via a linker. Therefore, the intermediate of the present invention does not generally form a micelle.

The above-mentioned intermediate of the present invention is preferably used for modifying the above-mentioned bio-related substances such as protein, peptide, antibody, nucleic acid and the like.

Therefore, the present invention also provides a modification method of a bio-related substance (hereinafter to be also referred to as "the modification method of the present invention" in the present specification).

In the modification method of the present invention, the intermediate of the present invention is bonded to a bio-related substance via a functional group for X in the formula (2). Therefore, the carboxyl group present in the side chain of the polyamino acid moiety of the block polymer derivative bonded to the bio-related substance is present in a free state, and the negative charge due to the polyamino acid moiety can be sufficiently imparted to the bio-related substance.

In the modification method of the present invention, the intermediate of the present invention is reacted with a bio-related substance by dissolving the bio-related substance and the intermediate of the present invention in a buffer (e.g., sodium acetate buffer) at pH of about 5-5.5 or a buffer (e.g., sodium phosphate buffer) at pH of about 8, at 20° C.-25° C. and the like.

The reaction between the functional group of a bio-related substance and the functional group for X in the intermediate of the present invention can be performed using general reaction conditions and methods as described below, for example, by reaction on addition of a condensing agent and a reducing agent, or the like.

The conjugate of the present invention can be produced, for example, according to the route shown in the following process chart (I) when, in the formula (1), Q is an ethylene glycol residue and $L^2$ is a single bond.

Process chart (I)

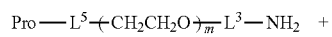

(3)

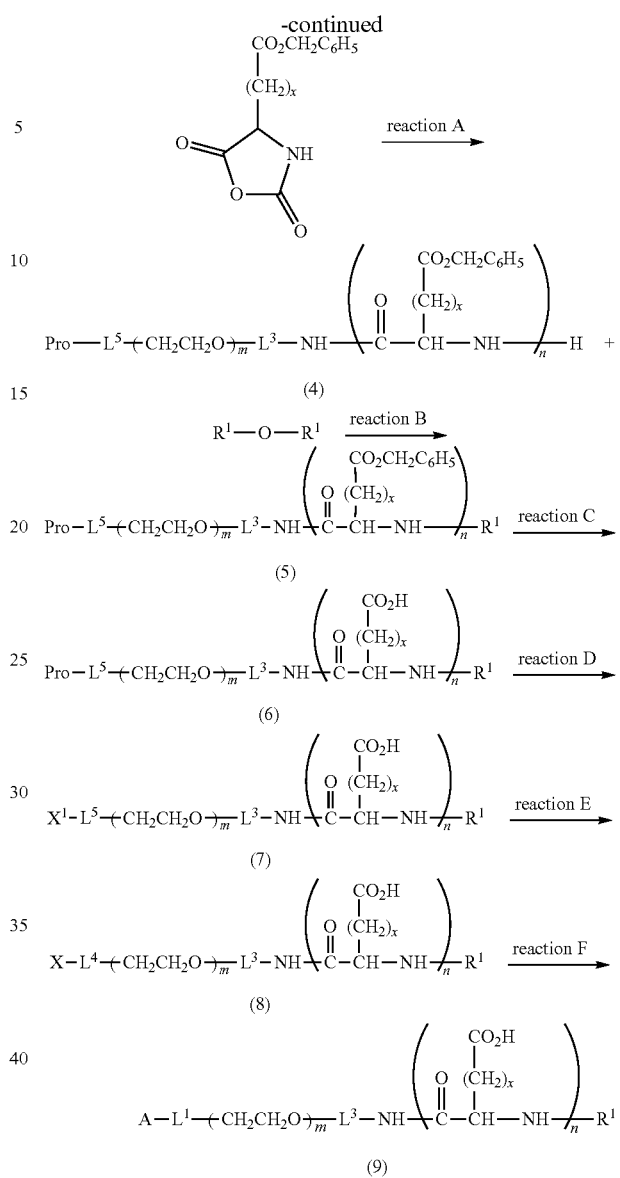

wherein, in the process chart (I), $X^1$ is a functional group, Pro is an $X^1$-protecting group, $L^5$ is a divalent linker, $R^1$ is an acyl group, and A, X, $L^1$, $L^3$, $L^4$, m, n, x are as defined above.

In process chart (I), the functional group for $X^1$ is basically the same as the functional group X in the formula (2), and is, for example, an aldehyde group, a maleimide group, a hydroxyl group, a carboxyl group, a thiol group, an amino group, an oxyamino group, a hydrazide group or the like, preferably an aldehyde group, a maleimide group, a hydroxyl group, an amino group or an oxyamino group, particularly preferably an aldehyde group, a maleimide group or an amino group.

In process chart (I), Pro is a protecting group of functional group $X^1$.

As used herein, the "protecting group" is a group that prevents or inhibits the reaction of a certain chemically reactive functional group in the molecule under certain reaction conditions. The protecting group is changed according to the kind of the chemically reactive functional group to be protected, the conditions used and the presence of other functional group or protecting group in the molecule. Specific examples of the protecting group can be found in many general books and recited in, for example, "Wuts, P. G. M.; Greene, T. W. Protective Groups in Organic Synthesis, 4th ed.; Wiley-Interscience: New York, 2007".

A functional group protected by a protecting group can be deprotected, i.e., chemically reacted, under the reaction conditions suitable for each protective group, to regenerate the original functional group. Representative deprotection conditions of protecting group are described in the aforementioned documents.

In this process, aldehyde-protecting group, maleimide-protecting group, hydroxyl-protecting group, carboxyl-protecting group, thiol-protecting group, amino-protecting group, oxyamino-protecting group, hydrazide-protecting group and the like can be mentioned, aldehyde-protecting group, maleimide-protecting group, hydroxyl-protecting group, amino-protecting group, oxyamino-protecting group are preferable, and aldehyde-protecting group, maleimide-protecting group and amino-protecting group are particularly preferable.

In process chart (I), the linker for $L^5$ is the same as the divalent linkers $L^2$, $L^3$, $L^4$ in the formula (2).

In process chart (I), the acyl group for $R^1$ is preferably an acetyl group, a propionyl group, more preferably an acetyl group.

The reaction A in process chart (I) is a ring opening polymerization reaction using, as an initiator, amine derivative (3) of polyethylene glycol having a protecting group on one terminal, and α-amino acid N-carboxyanhydride as a monomer. This reaction can afford polyethylene glycol-polyamino acid block polymer derivative (4) having a protecting group on one terminal.

Reaction B in process chart (I) is a reaction of acid anhydride with a terminal amino group of polyamino acid of block polymer derivative (4) obtained in reaction A. This reaction can afford block polymer derivative (5) in which the terminal amino group of polyamino acid is blocked by an acyl group.

Reaction C in process chart (I) is a reaction to remove benzyl group, which is a protecting group of the side chain carboxyl group of polyamino acid of block polymer derivative (5) obtained in reaction B. This reaction can afford block polymer derivative (6) in which the side chain carboxyl group of polyamino acid is free.

Reaction D in process chart (I) is a reaction to remove protecting group at the polyethylene glycol terminal of the block polymer derivative (6) obtained in reaction C. This reaction can afford block polymer derivative (7) having a functional group at the terminal. Reaction D can also be performed simultaneously with the aforementioned reaction C.

Reaction E in process chart (I) is a reaction to convert terminal functional group of block polymer derivative (7) obtained in reaction D to a different functional group as necessary to give block polymer derivative (8). It is not always necessary to carry out this process.

Reaction F in process chart (I) is a reaction to conjugate block polymer derivative (7) or (8) obtained in reaction D or reaction E to a bio-related substance to give block polymer conjugate (9). A method for conjugating the block polymer derivative to a bio-related substance in reaction F is not particularly limited. For example, the method described in "Hermanson, G. T. Bioconjugate Techniques, 3rd ed.; Academic Press: San Diego, CA, 2013" or "Mark, Sonny S. Bioconjugate protocols, strategies and methods; 2011" can be used.

The conjugate of the present invention can be produced, for example, according to the route shown in the following process chart (II) when, in the formula (1), Q is a glycerol residue and $L^2$ is a single bond.

Process chart (II)

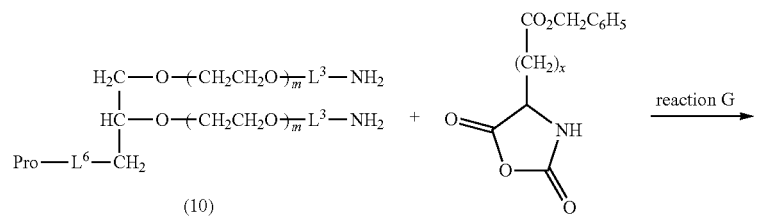

(10)

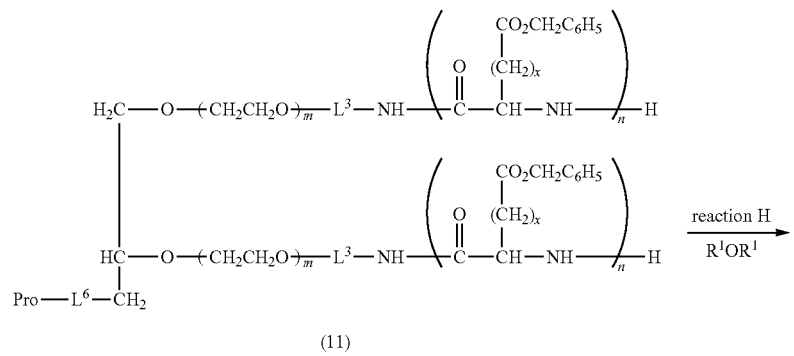

(11)

-continued
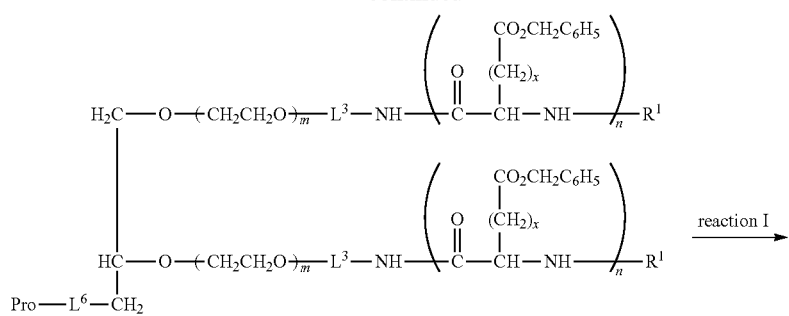
(12)
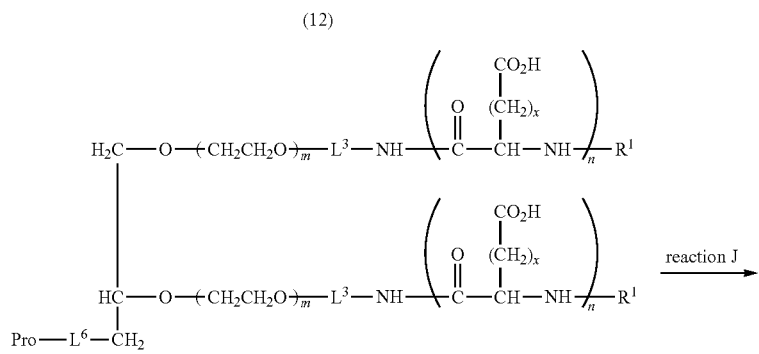
(13)
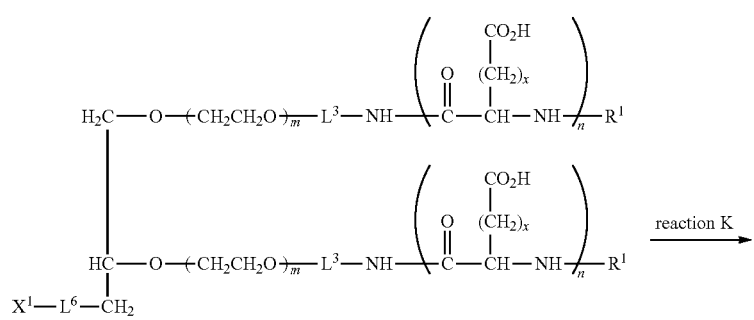
(14)
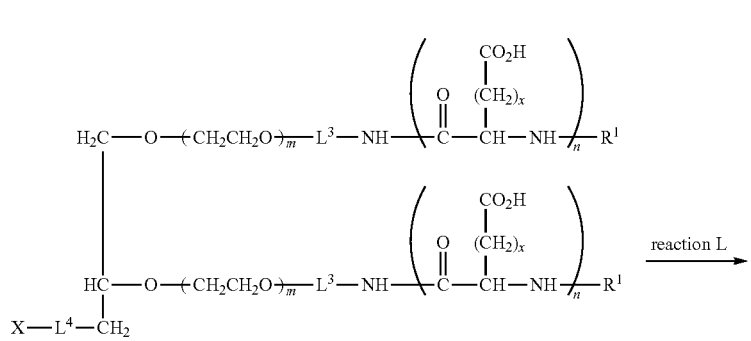
(15)

-continued

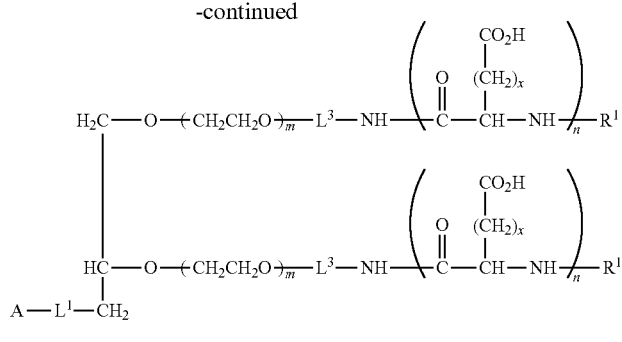

(16)

wherein, in the process chart (II), $L^6$ is a divalent linker, and $X^1$, Pro, $R^1$, A, X, $L^1$, $L^3$, $L^4$, m, n, x are as defined above.

In process chart (II), the divalent linker for $L^6$ is the same as the divalent linkers for $L^2$, $L^3$, $L^4$, $L^5$ in the formula (2) and process chart (I).

Reaction G in process chart (II) is a ring opening polymerization reaction using, as an initiator, 2 branched chain type polyethylene glycol amine derivative (10) having a protecting group at the 3-position of the glycerol skeleton and a polyethylene glycol chain at the 1-position and the 2-position, and α-amino acid N-carboxyanhydride as a monomer. This reaction can afford 2 branched chain type polyethylene glycol-polyamino acid block polymer derivative (11) having a protecting group.

Reaction H in process chart (II) is a reaction of acid anhydride with a terminal amino group of polyamino acid of block polymer derivative (11) obtained in reaction G. This reaction can afford block polymer derivative (12) in which the terminal amino group of polyamino acid is blocked by an acyl group.

Reaction I in process chart (II) is a reaction to remove benzyl group, which is a protecting group of the side chain carboxyl group of polyamino acid of block polymer derivative (12) obtained in reaction H. This reaction can afford block polymer derivative (13) in which the side chain carboxyl group of polyamino acid is free.

Reaction J in process chart (II) is a reaction to remove protecting group of the block polymer derivative (13) obtained in reaction I. This reaction can afford block polymer derivative (14) having a functional group. Reaction J can also be performed simultaneously with the aforementioned reaction I.

Reaction K in process chart (II) is a reaction to convert terminal functional group of block polymer derivative (14) obtained in reaction J to a different functional group as necessary to give block polymer derivative (15). It is not always necessary to carry out this process.

Reaction L in process chart (II) is a reaction to conjugate block polymer derivative (14) or (15) obtained in reaction J or reaction K to a bio-related substance to give block polymer conjugate (16). A method for conjugating the block polymer derivative to a bio-related substance in reaction L is not particularly limited. For example, the method described in "Hermanson, G. T. Bioconjugate Techniques, 3rd ed.; Academic Press: San Diego, CA, 2013" or "Mark, Sonny S. Bioconjugate protocols, strategies and methods; 2011" can be used.

The block polymer derivative can be purified by a purification method known as a general method, for example, crystallization, dialysis, gel permeation chromatography (GPC), ion exchange chromatography (IEC) and the like.

The obtained block polymer derivative can be evaluated by a general analysis method, such as GPC, IEC, measurement using matrix-assisted laser desorption/ionization time-of-flight mass spectrometer (MALDI-TOF-MS), reversed-phase liquid chromatography (RPLC), nuclear magnetic resonance (NMR) and the like.

The conjugate of the present invention can be purified by a purification method known as a general method, for example, dialysis, GPC, IEC and the like.

The obtained conjugate of the present invention can be evaluated by a general analysis method, for example, MALDI-TOF-MS, polyacrylamide gel electrophoresis (SDS-PAGE), RPLC, size-exclusion chromatography, circular dichroism measurement and the like.

While a test method for evaluating the half-life in blood of a bio-related substance conjugated to a block polymer derivative is not particularly limited, for example, it can be evaluated by collecting blood periodically from the administered animal and measuring the concentration of the administered bio-related substance in the blood using an appropriate analysis instrument. Specifically, a method for monitoring by ELISA (Enzyme-Linked ImmunoSorbent Assay) and the like, and the like can be mentioned.

While a method for evaluating the physiological activity of a bio-related substance conjugated with a block polymer derivative is not particularly limited, it can be evaluated by, for example, regularly collecting blood from the administered animal, and measuring the substance in the blood, such as blood glucose concentration when the bio-related substance is insulin and blood calcium concentration when it is calcitonin, by using an appropriate analysis instrument. Specifically, the physiological activity of insulin can be evaluated by monitoring a decrease in the glucose concentration after administration by using a glucose measurement kit, the physiological activity of calcitonin can be evaluated by monitoring a decrease in the calcium concentration after administration by using a calcium measurement kit. In the case of a growth hormone and the like, the physiological activity can be evaluated by administering same to a pituitary gland-excised animal, and evaluating weight gain, bone elongation, and the like.

EXAMPLES

The present invention is explained in more detail in the following by illustrating Examples.

In the following Examples, $^1$H-NMR was obtained using a nuclear magnetic resonance apparatus "JNM-ECP400" or "JNM-ECA600" manufactured by JEOL datum Ltd. For the measurement, a φ5 mm tube was used and, as a deuterated solvent, deuterium oxide ($D_2O$) or deuterated chloroform ($CDCl_3$) containing tetramethylsilane (TMS) as the internal standard and dimethyl sulfoxide $d_6$ ($d_6$-DMSO) was/were used.

The molecular weight of the obtained block polymer derivative and the conjugate of the present invention was measured using MALDI-TOF-MS ("AutoflexIII" manufactured by Bruker). As a matrix of the aforementioned MS, ferulic acid and sinapic acid were used, and diisopropylethyleneamine was added as an additive where necessary.

Example 1

Synthesis of Block Polymer Derivative (19); $NH_2$-050GL$^{10}$-AC ($NH_2$-PEG-poly(γ-glutamate)-acetyl, m1=ca. 105, n1=ca. 10

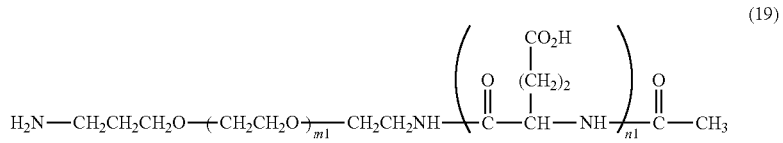

(19)

(1) Synthesis of Block Polymer Derivative (17); BO-050BG10-AC (Boc-NH-PEG-poly(γ-benzyl glutamate)-acetyl, m1=ca. 105, n1=ca. 10

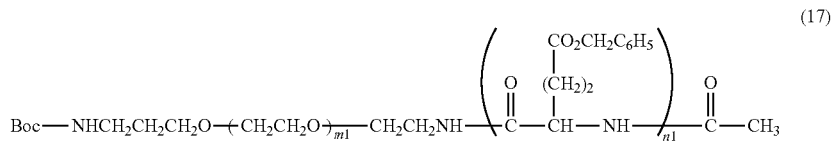

(17)

α-2-Aminoethyl-ω-3-(N-t-butoxycarbonylamino)propyloxy-polyoxyethylene ("SUNBRIGHT BO-050EA" manufactured by NOF CORPORATION, number average molecular weight=4,635 Da) (5 g) were placed in a 200 mL three-necked flask, and dissolved in dehydrated dimethylformamide (DMF) (75 g). Thereto was added γ-benzyl-N-carboxy-L-glutamic anhydride (BLG-NCA) (2.64 g, 10 equivalents), and a polymerization reaction was performed under a nitrogen atmosphere at 40° C. for 6 hr. Thereafter, acetic anhydride (950 μL, 10 equivalents) was added, the mixture was stirred for 6 hr, and polymerization was discontinued by acetyl capping. After completion of the discontinuation reaction, the reaction solution was cooled to room temperature, and added to a mixed solution of ethyl acetate and hexane to allow for crystal precipitation. The crystals were collected by suction filtration, washed several times with a mixed solution of ethyl acetate and hexane and dried in vacuo to give the above-mentioned block polymer derivative (17) BO-050BG10-AC (yield 5.5 g).

$^1$H-NMR (d$^6$-DMSO) δ(ppm): 1.37 (9H, s, —OC(CH$_3$)$_3$), 1.59 (2H, m, NH—CH$_2$CH$_2$CH$_2$-PEG), 1.70-2.60 (br, [CO—CH(CH$_2$CH$_2$COOCH$_2$Ph)NH]$_m$), 2.95 (2H, t, —NHCH$_2$CH$_2$CH$_2$-PEG), 3.10-3.30 (br, PEG-OCH$_2$CH$_2$NH), 3.40-3.80 (br, PEG), 3.80-4.00 (br, [CO—CH(CH$_2$CH$_2$COOCH$_2$Ph)NH]$_m$), 4.90-5.20 (br, [CO—CH(CH$_2$CH$_2$COOCH$_2$Ph)NH]$_m$), 7.15-7.50 (br, Ph), 7.90-8.45 (br, NH)

average degree of polymerization of polyglutamic acid: 10 (calculated by the following formula from peak integration value of NMR)

average degree of polymerization=peak integration value of Ph group (δ7.15-7.50 ppm)*/5

* value when the peak integration value of polyethylene glycol chain (3.4-3.8 ppm) was set to 421 which is the theoretical proton number of molecular weight=4,635 Da (2) Synthesis of Block Polymer Derivative (18); BO-050GL$^{10}$-AC (Boc-NH-PEG-poly(γ-glutamate)-acetyl, m1=ca. 105, n1=ca. 10

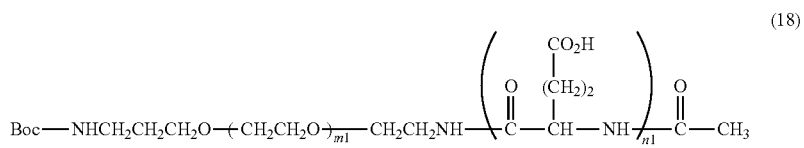

(18)

5 g of the block polymer derivative (17) (BO-0503G10-AC) obtained in (1) was placed in a 200 mL three-necked flask, and dispersed in water (40 g). 2.5 mol/L Aqueous sodium hydroxide solution (10 g) was added thereto, and the mixture was hydrolyzed at room temperature for 48 hr. Thereafter, the reaction solution was dialyzed for 24 hr at room temperature (dialysis membrane: Spectra/Por (registered trade mark) 7, molecular weight cut off (MWCO)=1,000, outer liquid: water), and the internal solution was lyophilized to give the above-mentioned block polymer derivative (18) (BO-050GL$^{10}$-AC) (yield 3.3 g).

$^1$H-NMR(D$_2$O) δ(ppm): 1.45 (9H, s, —OC(CH$_3$)$_3$), 1.77 (2H, m, NH—CH$_2$CH$_2$CH$_2$-PEG), 1.85-2.6 (br, [CO—CH(CH$_2$CH$_2$COOH)NH]$_m$), 3.16 (2H, t, —NHCH$_2$CH$_2$-PEG), 3.50-3.80 (br, PEG), 4.10-4.45 (br, [CO—CH(CH$_2$CH$_2$COOH)NH]$_m$)

TOF-MS: molecular weight 6,292 (FIG. 1)

(3) Synthesis of Block Polymer Derivative (19); NH$_2$-050GL$^{10}$-AC (NH$_2$-PEG-poly(γ-glutamate)-acetyl, m1=ca. 105, n1=ca. 10

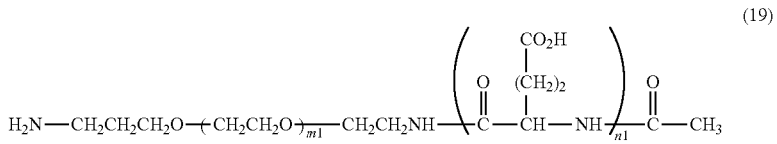

1 g of the block polymer derivative (18) (BO-050GL$^{10}$-AC) obtained in (2) was placed in a 200 mL three-necked flask, and dissolved in a mixed solution (10 mL) of 54 volume % dichloromethane/45 volume % trifluoroacetic acid/1 volume % water, and a deprotection reaction was performed at room temperature for 1 hr. The solvent and trifluoroacetic acid were removed by concentration, and the concentrated reaction mixture was dissolved in water and neutralized with 10 mM aqueous ammonium carbonate solution. Thereafter, the mixture was dialyzed for 24 hr at room temperature (dialysis membrane: Spectra/Por (registered trade mark) 7, MWCO=1,000, outer liquid: water), and the internal solution was lyophilized to give the above-mentioned block polymer derivative (19) (NH$_2$-050GL$^{10}$-AC) (yield 0.7 g).

$^1$H-NMR(D$_2$O) δ(ppm): 1.77 (2H, m, NH—CH$_2$CH$_2$CH$_2$-PEG), 1.85-2.6 (br, [CO—CH(CH$_2$CH$_2$COOH)NH]$_m$), 3.16 (2H, t, —NHCH$_2$CH$_2$CH$_2$-PEG), 3.50-3.80 (br, PEG), 4.10-4.45 (br, [CO—CH(CH$_2$CH$_2$COOH)NH]$_m$) amino group content: 0.124×10$^{-3}$ mmol/mg (TNBS (2,4,6-trinitrobenzenesulfonic acid) assay)

Example 2

Synthesis of Block Polymer Derivative (20); NH$_2$-050GL$^{50}$-AC (NH$_2$-PEG-poly(γ-glutamate)-acetyl, m1=ca. 105, n2=ca. 46

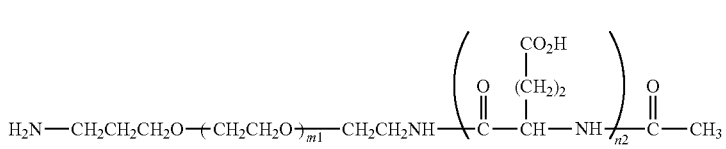

Using 50 equivalents of the starting material, BLG-NCA, as the amount to be added, polyglutamic acid was introduced into the terminal of PEG chain and deprotection was performed in the same manner as in Example 1 to give the above-mentioned block polymer derivative (20) (NH$_2$-050GL$^{50}$-AC) (yield 0.9 g).

$^1$H-NMR(D$_2$O) δ(ppm): 1.77 (2H, m, NH—CH$_2$CH$_2$CH$_2$-PEG), 1.85-2.6 (br, [CO—CH(CH$_2$CH$_2$COOH)NH]$_m$), 3.16 (2H, t, —NHCH$_2$CH$_2$CH$_2$-PEG), 3.50-3.80 (br, PEG), 4.10-4.45 (br, [CO—CH(CH$_2$CH$_2$COOH)NH]$_m$) average degree of polymerization of polyglutamic acid: 46 (versus PEG chain standard (421H))

TOF-MS: molecular weight 12,731 amino group content: 0.0532×10$^{-3}$ mmol/mg (TNBS assay)

Example 3

Synthesis of Block Polymer Derivative (21); NH$_2$-050GL$^{100}$-AC (NH$_2$-PEG-poly(γ-glutamate)-acetyl, m1=ca. 105, n3=ca. 92

Using 100 equivalents of the starting material, BLG-NCA, as the amount to be added, polyglutamic acid was introduced into the terminal of PEG chain and deprotection was performed in the same manner as in Example 1 to give the above-mentioned block polymer derivative (21) (NH$_2$-050GL$^{100}$-AC) (yield 0.7 g).

$^1$H-NMR (D$_2$O) δ(ppm): 1.77 (2H, m, NH—CH$_2$CH$_2$CH$_2$-PEG), 1.85-2.6 (br, [CO—CH(CH$_2$CH$_2$COOH)NH]$_m$), 3.16 (2H, t, —NHCH$_2$CH$_2$CH$_2$-PEG), 3.50-3.80 (br, PEG), 4.10-4.45 (br, [CO—CH(CH$_2$CH$_2$COOH)NH]$_m$) average degree of polymerization of polyglutamic acid: 92 (versus PEG chain standard (421H))

TOF-MS: molecular weight 17,569 amino group content: 0.0402×10$^{-3}$ mmol/mg (TNBS assay)

Example 4

Synthesis of Block Polymer Derivative (23);
AL-050GL$^{10}$-AC (Aldehyde-PEG-poly(γ-glutamate)-acetyl, m1=ca. 103, n1=ca. 10

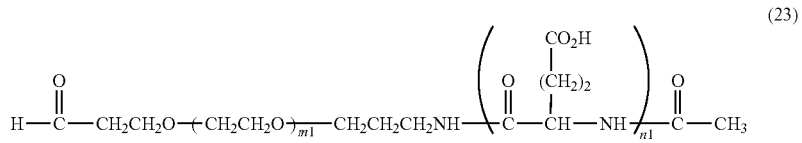

(1) Synthesis of Block Polymer Derivative (22);
DE-050BG10-AC (Diethylacetal-PEG-poly(γ-glutamate)-acetyl, m1=ca. 103, n1=ca. 10

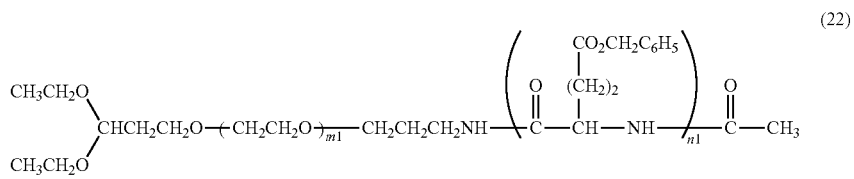

α-3-Aminopropyl-ω-3,3-diethoxypropyloxy-polyoxyethylene ("SUNBRIGHT PA-050DE" manufactured by NOF CORPORATION, number average molecular weight=4,544 Da) (5.0 g) were placed in a 200 mL three-necked flask, and dissolved in dehydrated DMF (75 g). Thereto was added γ-benzyl-N-carboxy-L-glutamic anhydride (BLG-NCA) (2.64 g, 10 equivalents), and a polymerization reaction was performed under a nitrogen atmosphere at 40° C. for 6 hr. Thereafter, triethylamine (3.49 mL, 25 equivalents) and acetic anhydride (950 μL, 10 equivalents) were added, the mixture was stirred for 6 hr, and polymerization was discontinued by acetyl capping. After completion of the discontinuation reaction, the reaction solution was cooled to room temperature, and added to a mixed solution of ethyl acetate and hexane to allow for crystal precipitation. The crystals were collected by suction filtration, washed several times with a mixed solution of ethyl acetate and hexane and dried in vacuo to give the above-mentioned block polymer derivative (22) (DE-050BG10-AC) (yield 6.0 g).

$^1$H-NMR(d$^6$-DMSO) δ(ppm): 1.11 (6H, t, —CH(OCH$_2$CH$_3$)$_2$), 1.65 (2H, m, NH—CH$_2$CH$_2$CH$_2$-PEG), 1.74 (2H, m, PEG-CHCH$_2$CH(OCH$_2$CH$_3$)$_2$), 1.80-2.62 (br, [CO—CH(CH$_2$CH$_2$COOCH$_2$Ph) NH]$_m$), 3.40-3.80 (br, PEG), 3.80-4.40 (br, [CO—CH(CH$_2$CH$_2$COOCH$_2$Ph) NH]$_m$), 4.55 (1H, m, PEG-CHCH$_2$CH(OCH$_2$CH$_3$)$_2$), 4.90-5.20 (br, [CO—CH (CH$_2$CH$_2$COOCH$_2$Ph)NH]$_m$), 7.15-7.50 (br, Ph), 7.90-8.50 (br, NH)

average degree of polymerization of polyglutamic acid: 10 (calculated by the following formula from peak integration value of NMR)

average degree of polymerization=peak integration value of Ph group (δ7.15-7.50 ppm)*/5

* value when the peak integration value of polyethylene glycol chain (3.4-3.8 ppm) was set to 413 which is the theoretical proton number of molecular weight=4,544 Da (2) Synthesis of Block Polymer Derivative (23);
AL-050GL$^{10}$-AC (Aldehyde-PEG-poly(γ-glutamate)-acetyl, m1=ca. 103, n1=ca. 10

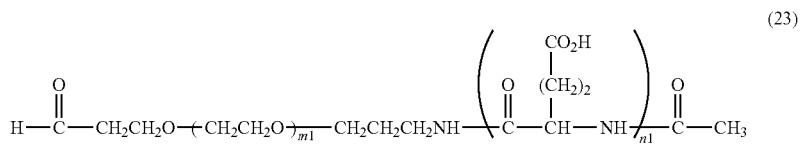

5 g of the block polymer derivative (22) (DE-050BG10-AC) obtained in (1) was placed in a 200 mL three-necked flask, and dispersed in water (40 g). 2.5 mol/L Aqueous sodium hydroxide solution (10 g) was added thereto, and the mixture was hydrolyzed at room temperature for 48 hr. Then, phosphoric acid was added to adjust the pH to 2.0, the mixture was stirred at room temperature for 3 hr, and a deprotection reaction of acetal group was performed. Thereafter, the reaction solution was neutralized with aqueous sodium hydroxide solution, and the reaction solution was dialyzed for 24 hr at room temperature (dialysis membrane: Spectra/Por (registered trade mark) 7, MWCO=1,000, outer liquid: water), and the internal solution was lyophilized to give the above-mentioned block polymer derivative (23) (AL-050GL$^{10}$-AC) (yield 4.2 g).

$^1$H-NMR (D$_2$O) δ(ppm): 1.7-2.6 (br, [CO—CH(CH$_2$CH$_2$COOH)NH]$_m$), 2.76 (t, —CH$_2$CH$_2$CHO), 3.40-4.00 (br, PEG), 3.15-3.3 (br), 4.20-4.40 (br, [CO—CH (CH$_2$CH$_2$COOH)NH]$_m$), 5.11 (t, —CH(OH)$_2$), 9.66 (s, —CHO) TOF-MS: molecular weight 6,319
aldehyde rate: 64% (calculated by the following formula from peak integration value of NMR)
aldehyde rate=peak integration value of aldehyde group (δ7.15-7.50 ppm)*/1×100
* value when the peak integration value of polyethylene glycol chain (9.66 ppm) was set to 413 which is the theoretical proton number of molecular weight=4,544 Da Example 5

Synthesis of Block Polymer Derivative (24); AL-050GL$^{50}$-AC (Aldehyde-PEG-poly(γ-glutamate)-acetyl, m1=ca. 103, n2=ca. 48

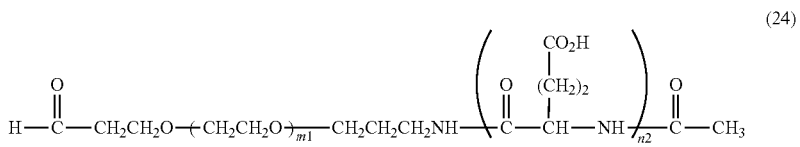

(24)

Using 50 equivalents of the starting material, BLG-NCA, as the amount to be added, polyglutamic acid was introduced into the terminal of PEG chain and deprotection was performed in the same manner as in Example 4 to give the above-mentioned block polymer derivative (24) (AL-050GL$^{50}$-AC) (yield 3.4 g).
$^1$H-NMR (D$_2$O) δ(ppm): 1.7-2.6 (br, [CO—CH(CH$_2$CH$_2$COOH)NH]$_m$), 2.76 (t, —CH$_2$CH$_2$CHO), 3.40-4.00 (br, PEG), 3.15-3.3 (br), 4.20-4.40 (br, [CO—CH(CH$_2$CH$_2$COOH)NH]$_m$), 5.11 (t, —CH(OH)$_2$), 9.66 (s, —CHO) average degree of polymerization of polyglutamic acid: 48 (versus PEG chain standard (413H))
TOF-MS: molecular weight 12,998
aldehyde rate: 75% (versus PEG chain standard (413H))

Example 6

Synthesis of Block Polymer Derivative (25); AL-050GL$^{100}$-AC (Aldehyde-PEG-poly(γ-glutamate)-acetyl, m1=ca. 103, n3=ca. 94

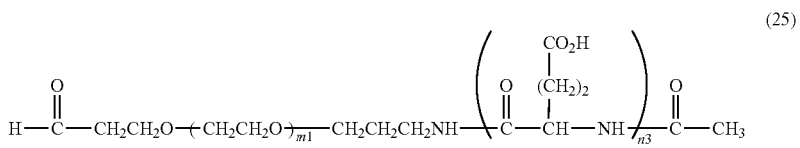

(25)

Using 100 equivalents of the starting material, BLG-NCA, as the amount to be added, polyglutamic acid was introduced into the terminal of PEG chain and deprotection was performed in the same manner as in Example 4 to give the above-mentioned block polymer derivative (25) (AL-050GL$^{100}$-AC) (yield 3.4 g).
$^1$H-NMR (D$_2$O) δ(ppm): 1.7-2.6 (br, [CO—CH(CH$_2$CH$_2$COOH)NH]$_m$), 2.76 (t, —CH$_2$CH$_2$CHO), 3.40-4.00 (br, PEG), 3.15-3.3 (br), 4.20-4.40 (br, [CO—CH(CH$_2$CH$_2$COOH)NH]$_m$), 5.11 (t, —CH(OH)$_2$), 9.66 (s, —CHO) average degree of polymerization of polyglutamic acid: 94 (versus PEG chain standard (413H))
TOF-MS: molecular weight 17,918
aldehyde rate: 63% (versus PEG chain standard (413H))

Example 7

Synthesis of Block Polymer Derivative (26);
AL-200GL$^{10}$-AC (Aldehyde-PEG-poly(γ-glutamate)-acetyl, m2=ca. 461, n1=ca. 9

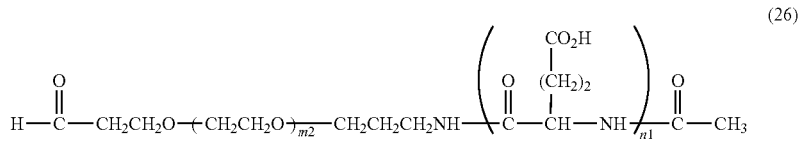

Using α-3-aminopropyl-ω-3,3-diethoxypropyloxy-polyoxyethylene ("SUNBRIGHT PA-200DE" manufactured by NOF CORPORATION, number average molecular weight=20,270 Da) as the starting material, BLG-NCA (11 equivalents) was added, polyglutamic acid was introduced into the terminal of PEG chain and deprotection was performed in the same manner as in Example 4 to give the above-mentioned block polymer derivative (26) (AL-200GL$^{10}$-AC) (yield 4.9 g).

$^1$H-NMR(D$_2$O) δ(ppm): 1.7-2.6 (br, [CO—CH(CH$_2$CH$_2$COOH)NH]$_m$), 2.76 (t, —CH$_2$CH$_2$CHO), 3.40-4.00 (br, PEG), 3.15-3.3 (br), 4.20-4.40 (br, [CO—CH(CH$_2$CH$_2$COOH)NH]$_m$), 5.11 (t, —CH(OH)$_2$), 9.66 (s, —CHO) average degree of polymerization of polyglutamic acid: 9 (versus PEG chain standard (1843H))

TOF-MS: molecular weight 26,346 aldehyde rate: 67% (versus PEG chain standard (1843H))

Example 8

Synthesis of Block Polymer Derivative (27);
AL-200GL$^{20}$-AC (Aldehyde-PEG-poly(γ-glutamate)-acetyl, m2=ca. 461, n4=ca. 19

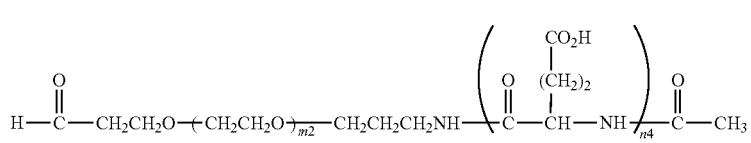

Using α-3-aminopropyl-ω-3,3-diethoxypropyloxy-polyoxyethylene ("SUNBRIGHT PA-200DE" manufactured by NOF CORPORATION, number average molecular weight=20,270 Da) as the starting material, BLG-NCA (22 equivalents) was added, polyglutamic acid was introduced into the terminal of PEG chain and deprotection was performed in the same manner as in Example 4 to give the above-mentioned block polymer derivative (27) (AL-200GL$^{20}$-AC) (yield 4.6 g).

$^1$H-NMR (D$_2$O) δ(ppm): 1.7-2.6 (br, [CO—CH(CH$_2$CH$_2$CH$_2$COOH)NH]$_m$), 2.76 (t, —CH$_2$CH$_2$CHO), 3.40-4.00 (br, PEG), 3.15-3.3 (br), 4.20-4.40 (br, [CO—CH(CH$_2$CH$_2$CH$_2$COOH)NH]$_m$), 5.11 (t, —CH(OH)$_2$), 9.66 (s, —CHO)

average degree of polymerization of polyglutamic acid: 19 (versus PEG chain standard (1843H))

TOF-MS: molecular weight 27,753 aldehyde rate: 66% (versus PEG chain standard (1843H))

Example 9

Figure 2:
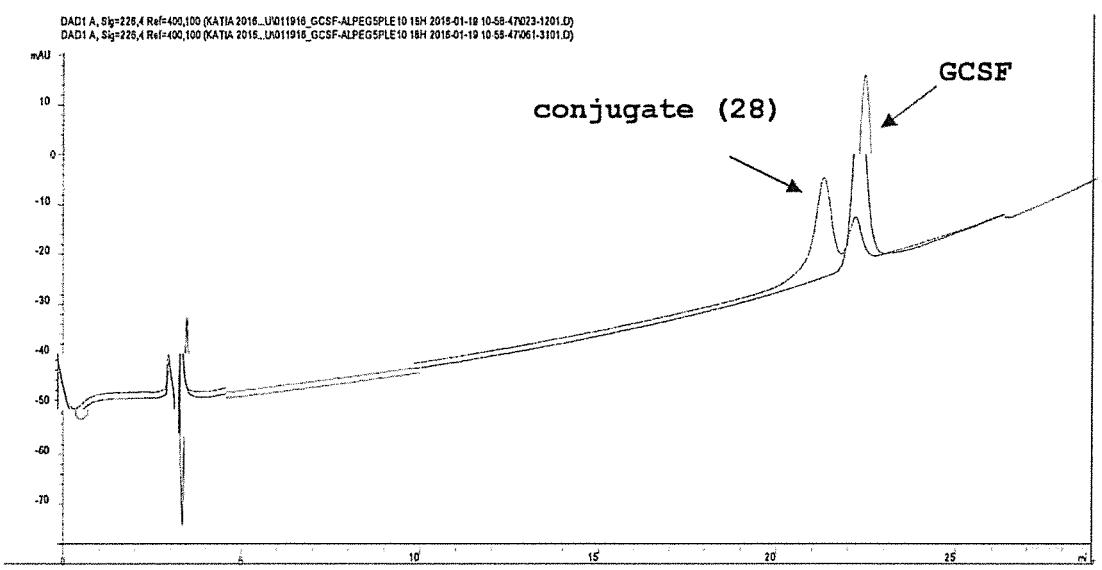
FIG. 2 shows the results of RP-HPLC analysis of a reaction mixture of conjugate (28) of block polymer derivative (23) and GCSF in Example 9 (1).

Reaction of N Terminal of Granulocyte Colony Stimulating Factor (GCSF) and Block Polymer Derivative (1) Synthesis of Conjugate (28) of Block Polymer Derivative (23) and GCSF To a 10 mM sodium acetate buffer (pH=5.5, containing 5 (w/v)% sorbitol) containing 3 mg of GCSF (amino acid sequence: as shown below) (derived from human, prepared according to a general method of transduction using *Escherichia coli*) was added 3 equivalents of block polymer derivative (23) obtained in Example 4 and having an aldehyde group, the GCSF concentration was adjusted to 3.0 mg/mL, and the mixture was stirred at 25° C. for 1 hr. Then, sodium cyanoborohydride (100 equivalents) which is a reducing agent was added, and the mixture was stirred at 25° C. for 24 hr. Furthermore, glycylglycine (100 equivalents) was added and the mixture was stirred at 25° C. for 1 hr to discontinue the reaction. Using reversed-phase liquid chromatography (RP-HPLC), analysis was performed under the following analysis conditions and progress of the reaction was confirmed as shown in FIG. 2.

<Amino Acid Sequence of GCSF>

(SEQ ID NO: 1)
TPLGPASSLP QSFLLKCLEQ VRKIQGDGAA LQEKLCATYK

LCHPEELVLL GHSLGIPWAP LSSCPSQALQ LAGCLSQLHS

GLFLYQGLLQ ALEGISPELG PTLDTLQLDV ADFATTIWQQ

MEELGMAPAL QPTQGAMPAF ASAFQRRAGG VLVASHLQSF

LEVSYRVLRH LAQP

<RP-HPLC Analysis Conditions>
apparatus: "Agilent 1200 Infinity" manufactured by Agilent Technologies
detector: UV (226 nm)
column: Phenomenex Jupiter 5 μm C18 300 Å column, 4.6×250 mm
mobile phase A: water+0.1 (v/v)% trifluoroacetic acid mobile phase B: acetonitrile+0.1 (v/v)% trifluoroacetic acid
flow rate: 1 mL/min
gradient conditions: as shown in Table 1

TABLE 1

|  | time (min) | | | |
|---|---|---|---|---|
|  | 0 | 25 | 27 | 29 |
| mobile phase B (%) | 40% | 70% | 90% | 40% |

As a result of RP-HPLC analysis, the reaction rate after reaction for 24 hr was about 80%.

Figure 3:
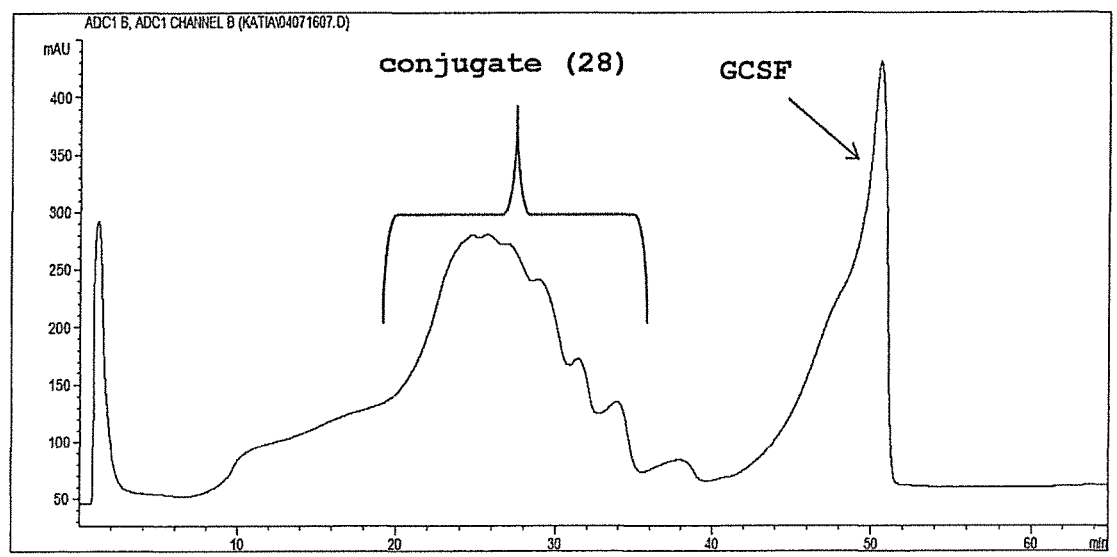
FIG. 3 shows the results of cation exchange chromatography purification of conjugate (28) of block polymer derivative (23) and GCSF in Example 9 (1).

The obtained reaction mixture was dialyzed for 24 hr at room temperature (dialysis membrane: manufactured by Delchimica Scientific glassware (molecular weight cut off=3.5 kDa), outer liquid: 10 mM aqueous sodium phosphate solution (pH=4.5)), after which purified by cation exchange chromatography under the following conditions and a fraction containing conjugate (28) shown in FIG. 3 was collected.

<Purification Conditions>
column: TSKgel SP-STAT 7 μm column, 4.6×100 mm
mobile phase A: 10 mM sodium phosphate, pH=4.5
mobile phase B: 100 mM sodium phosphate+100 mM sodium chloride, pH=5.75
flow rate: 0.7 mL/min
detection wavelength: 280 nm
gradient conditions: as shown in Table 2

TABLE 2

|  | time (min) | | | |
|---|---|---|---|---|
|  | 0 | 60 | 65 | 70 |
| mobile phase B (%) | 10% | 100% | 100% | 10% |

A solution containing the object material fractionated by the above-mentioned ion exchange chromatography purification was concentrated by ultrafiltration (centrifugal ultrafiltration filter; "Amicon", molecular weight cut off=10 kDa, 5000×g, 4° C.) and dialyzed for 24 hr at room temperature (dialysis membrane: manufactured by Delchimica Scientific glassware (molecular weight cut off=3.5 kDa), outer liquid: 10 mM sodium acetate buffer (pH=4.6, containing 5 (w/v)% sorbitol)). The GCSF concentration of the obtained solution was calculated by measuring the absorbance at 280 nm (absorption coefficient ε=0.88 mL/mg·cm).

For identification of the obtained conjugate (28) of block polymer derivative (23) and GCSF, the molecular weight was measured by MALDI-TOF-MS as mentioned above and analyzed by SDS-PAGE, circular dichroism measurement and size-exclusion chromatography as shown below, and it was confirmed that the object material was obtained.

(i) Measurement of Molecular Weight by MALDI-TOF-MS

Figure 4:
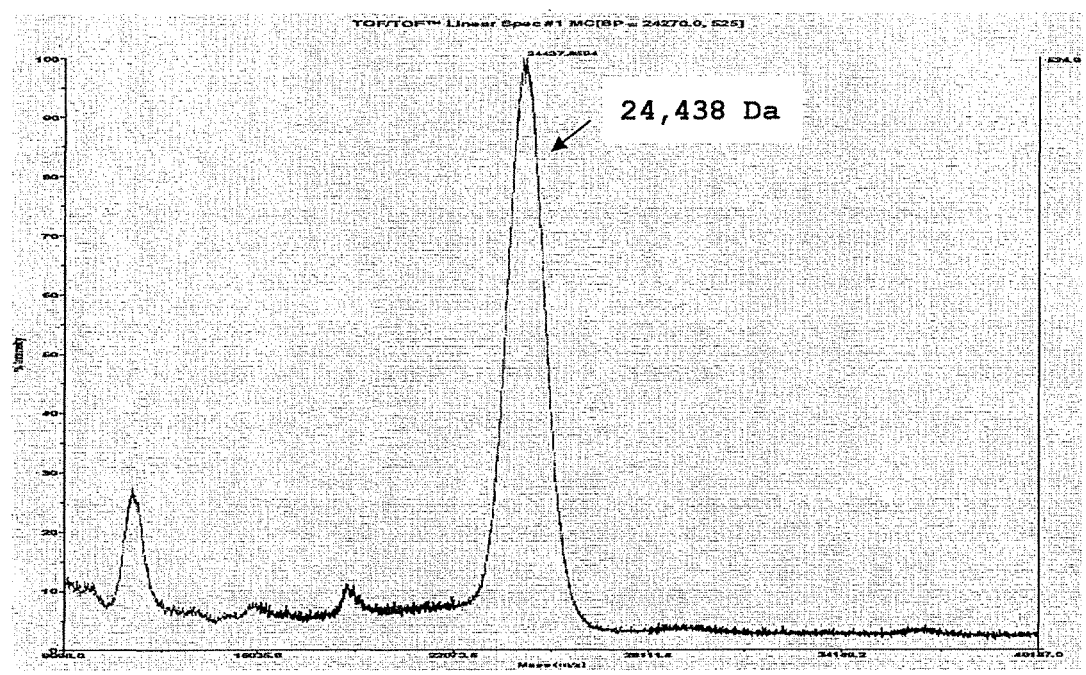
FIG. 4 shows the results of MALDI-TOF-MS analysis of conjugate (28) of block polymer derivative (23) and GCSF in Example 9 (1).

The measurement results are shown in FIG. 4. From FIG. 4, the molecular weight measured by MALDI-TOF-MS was 24,438 Da, and synthesis of conjugate (28) was suggested.

(ii) SDS-PAGE

As SDS-PAGE kit, "4-15% Mini-PROTEAN (registered trade mark) TGX (trade mark) precast gel (BIO-RAD)" was used and conjugate (28) was evaluated according to the recommended measurement condition of the kit.

As a staining solution, Coomassie Brilliant Blue solution (CBB solution) and iodine staining solution (barium chloride solution+iodine solution) were used.

Figure 5:
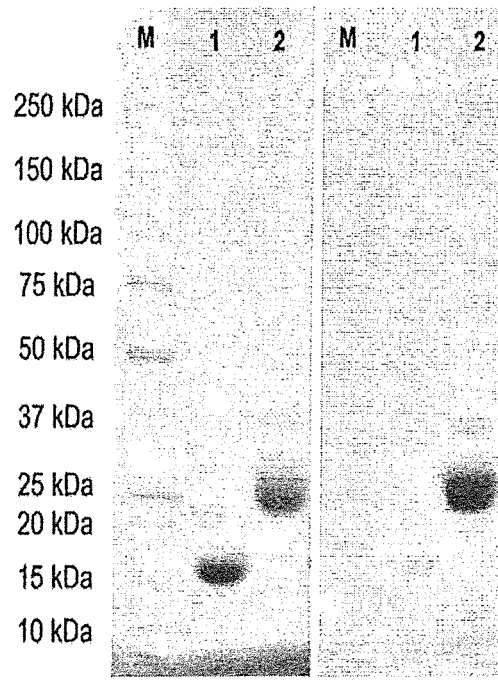
FIG. 5 shows the results of SDS-PAGE analysis of conjugate (28) of block polymer derivative (23) and GCSF in Example 9 (1).

The results of SDS-PAGE are shown in FIG. 5. In FIG. 5, lane M shows molecular weight marker, lane 1 shows GCSF, and lane 2 shows conjugate (28). The left Figure shows the results of protein detection by Coomassie Brilliant Blue (CBB) staining, and the right Figure shows the detection results of PEG by iodine staining.

In the analysis results of conjugate (28) (lane 2), bands were detected by CBB staining, which selectively stains proteins and peptides. Furthermore, bands were also detected by iodine staining, which stains polyethylene glycol. Since bands were detected in both stainings, it was confirmed that the object product in which block polymer derivative (23) and GCSF were conjugated was obtained.

(iii) Measurement of Circular Dichroism

Measurement of circular dichroism is known as an effective means to investigate the denatured state of proteins. Using the following apparatus, the circular dichroism was measured at the following wavelength.

apparatus: Jasco J-700 Spectropolarimeter
wavelength: 200-250 nm

When the spectrum of GCSF obtained by the measurement and the spectrum of conjugate (28) were superimposed, the shapes matched. Thus, it was confirmed that GCSF was not denatured by modification with block polymer derivative (23).

(iv) Size-Exclusion Chromatography Analysis

Analysis was performed under the following analysis conditions.

<Analysis Conditions>
apparatus: Jasco LC1500-2000
column: Zorbax GF-250 Bio series, particle size=4 μm, 150 angstrom, 4.6 mm×250 mm (Agilent)
mobile phase: 20 mM sodium phosphate+130 mM sodium chloride (pH=7.0)+20 volume % acetonitrile
flow rate: 0.3 mL/min
detection wavelength: 226 nm The chromatograms obtained for GCSF and conjugate (28) were compared to find that the peak of conjugate (28) shifted toward high molecular weight side as compared to the peak of GCSF. That is, it was confirmed that block polymer derivative (23) bound to GCSF and that the molecular weight increased.

(2) Synthesis of Conjugate (29) of Block Polymer Derivative (24) and GCSF

In the same manner as in Example 9 (1) except that block polymer derivative (24) was used as the starting material, and the gradient conditions during purification by cation exchange chromatography were those shown in Table 3, conjugate (29) of block polymer derivative (24) and GCSF was synthesized.

TABLE 3

|  | time (min) | | | |
|---|---|---|---|---|
|  | 0 | 10 | 70 | 75 |
| mobile phase B (%) | 2% | 2% | 100% | 2% |

For identification of the obtained conjugate (29) of block polymer derivative (24) and GCSF, the molecular weight was measured by MALDI-TOF-MS and analyzed by SDS-PAGE, circular dichroism measurement and size-exclusion chromatography in the same manner as in Example 9 (1), and it was confirmed that the object material was obtained.

(3) Synthesis of Conjugate (30) of Block Polymer Derivative (25) and GCSF

In the same manner as in Example 9 (1) except that block polymer derivative (25) was used as the starting material, and the gradient conditions during purification by cation exchange chromatography were those shown in Table 4, conjugate (30) of block polymer derivative (25) and GCSF was synthesized.

TABLE 4

|  | time (min) | | | |
| --- | --- | --- | --- | --- |
|  | 0 | 15 | 75 | 80 |
| mobile phase B (%) | 2% | 2% | 100% | 2% |

For identification of the obtained conjugate (30) of block polymer derivative (25) and GCSF, the molecular weight was measured by MALDI-TOF-MS and analyzed by SDS-PAGE, circular dichroism measurement and size-exclusion chromatography in the same manner as in Example 9 (1), and it was confirmed that the object material was obtained.

(4) Synthesis of Conjugate (31) of Block Polymer Derivative (26) and GCSF

Figure 6:
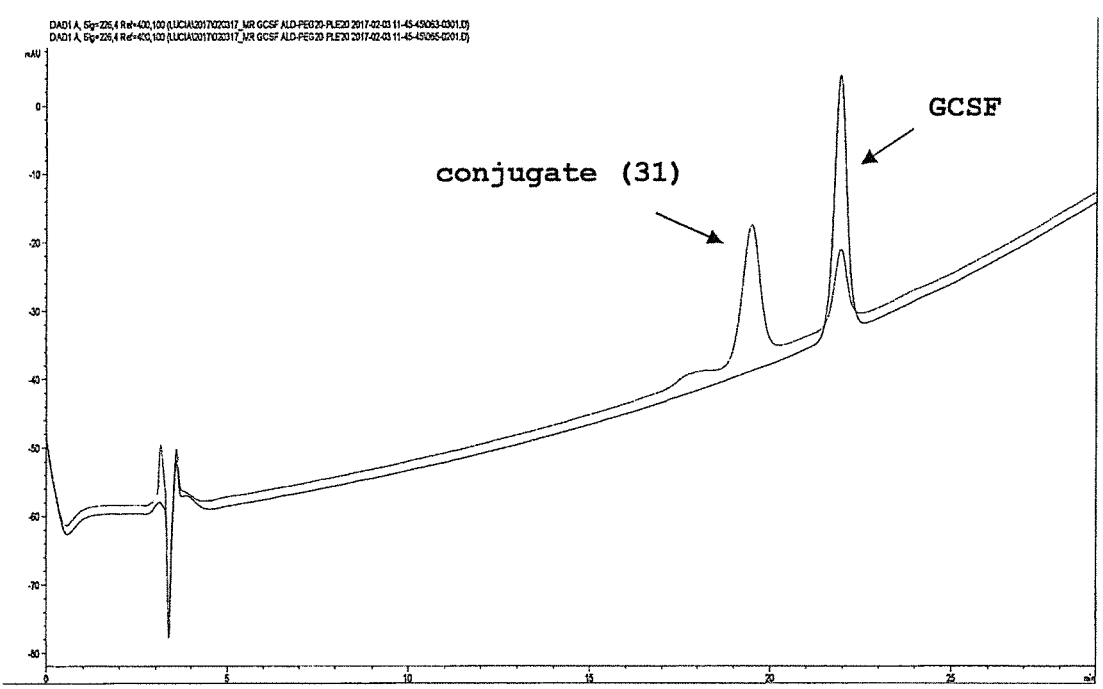
FIG. 6 shows the results of RP-HPLC analysis of a reaction mixture of conjugate (31) of block polymer derivative (26) and GCSF in Example 9 (4).

In the same manner as in Example 9 (1) except that block polymer derivative (26) was used as the starting material, conjugate (31) of block polymer derivative (26) and GCSF was synthesized. Using RP-HPLC, analysis was performed and progress of the reaction was confirmed as shown in FIG. 6.

Then, purification using cation exchange chromatography was performed under the following purification conditions.

<Purification Conditions>
column: TSKgel SP-STAT 7 μm column, 4.6×100 mm
mobile phase A: 10 mM sodium phosphate, pH=4.5
mobile phase B: 100 mM sodium phosphate, pH=5.75
flow rate: 0.7 mL/min
detection wavelength: 280 nm
gradient conditions: as shown in Table 5

TABLE 5

|  | time (min) | | | |
| --- | --- | --- | --- | --- |
|  | 0 | 10 | 70 | 75 | 80 |
| mobile phase B (%) | 10% | 10% | 80% | 100% | 10% |

For identification of the obtained conjugate (31) of block polymer derivative (26) and GCSF, the molecular weight was measured by MALDI-TOF-MS (FIG. 7) and analyzed by SDS-PAGE, circular dichroism measurement and size-exclusion chromatography in the same manner as in Example 9 (1), and it was confirmed that the object material was obtained.

(5) Synthesis of Conjugate (32) of Block Polymer Derivative (27) and GCSF

In the same manner as in Example 9 (4) except that block polymer derivative (27) was used as the starting material, conjugate (32) of block polymer derivative (27) and GCSF was synthesized.

For identification of the obtained conjugate (32) of block polymer derivative (27) and GCSF, the molecular weight was measured by MALDI-TOF-MS and analyzed by SDS-PAGE, circular dichroism measurement and size-exclusion chromatography in the same manner as in Example 9 (1), and it was confirmed that the object material was obtained.

Example 10

Reaction of Glutamine Residue of Granulocyte Colony Stimulating Factor (GCSF) and Block Polymer Derivative Using Transglutaminase as Catalyst (1) Synthesis of Conjugate (33) of Block Polymer Derivative (19) and GCSF To a 10 mM sodium phosphate buffer (pH=8.0, containing 5 (w/v)% sorbitol) containing 3 mg of GCSF was added 3 equivalents of block polymer derivative (19) obtained in Example 1 and having an amino group, and the GCSF concentration was adjusted to 2.0 mg/mL. Then, microorganism-derived transglutaminase (TGage, "Activa (registered trade mark) WM" (manufactured by Ajinomoto Co., Inc.)) (0.06 mg, 2 wt %/GCSF) was added and the mixture was stirred at 25° C. for 4 hr. Furthermore, N-ethylmaleimide was added at 0.8 equivalents relative to TGage and the mixture was stirred at 25° C. for 1 hr to discontinue the reaction.

Figures 7, 8:
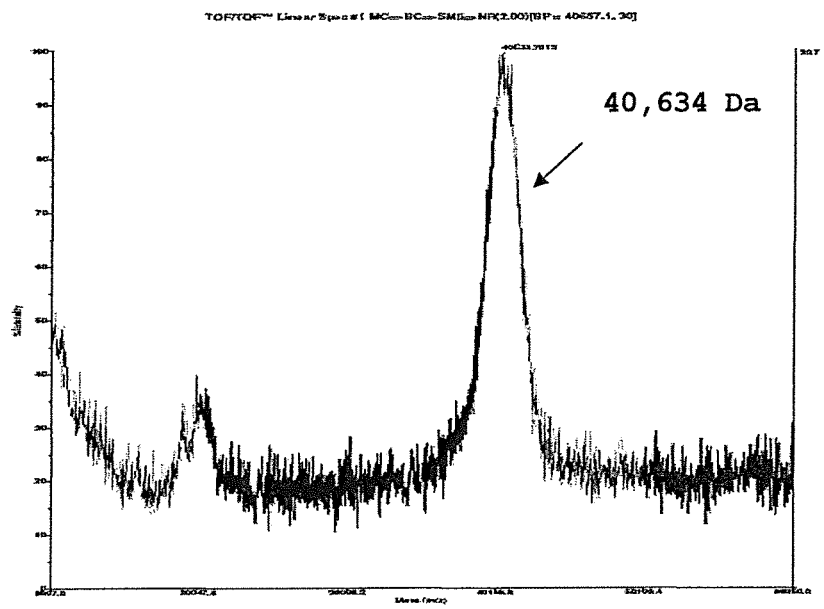
FIG. 7 shows the results of MALDI-TOF-MS analysis of conjugate (31) of block polymer derivative (26) and GCSF in Example 9 (4).
FIG. 8 shows the results of RP-HPLC analysis of a reaction mixture of conjugate (33) of block polymer derivative (19) and GCSF in Example 10 (1).

Using RP-HPLC, analysis was performed and progress of the reaction was confirmed as shown in FIG. 8. The analysis conditions of RP-HPLC were the same as those in the above-mentioned Example 9 (1).

As a result of RP-HPLC analysis, the reaction rate after reaction for 4 hr was about 84%.

The reaction mixture was diluted 5-fold with 10 mM sodium phosphate (pH=4.5) and purified by cation exchange chromatography. The purification conditions are shown below.

<Purification Conditions>
column: TSKgel SP-STAT 7 μm column, 4.6×100 mm
mobile phase A: 10 mM sodium phosphate, pH=4.5
mobile phase B: 100 mM sodium phosphate, pH=5.75
flow rate: 0.7 mL/min
detection wavelength: 280 nm
gradient conditions: as shown in Table 6

TABLE 6

|  | time (min) | | | | |
| --- | --- | --- | --- | --- | --- |
|  | 0 | 10 | 70 | 75 | 80 |
| mobile phase B (%) | 10% | 10% | 80% | 100% | 10% |

A solution containing the object material fractionated by the above-mentioned ion exchange chromatography purification was concentrated by ultrafiltration (centrifugal ultrafiltration filter; "Amicon" (molecular weight cut off=10 kDa) 5000×g, 4° C.) and dialyzed for 24 hr at room temperature (dialysis membrane: manufactured by Delchimica Scientific glassware (molecular weight cut off=3.5 kDa), outer liquid: 10 mM sodium acetate buffer (pH=4.6, containing 5 (w/v)% sorbitol)). The GCSF concentration of the obtained solution was calculated by measuring the absorbance at 280 nm (absorption coefficient ε=0.88 mL/mg·cm).

For identification of the obtained conjugate (33) of block polymer derivative (19) and GCSF, the molecular weight was measured by MALDI-TOF-MS and analyzed by SDS-PAGE, circular dichroism measurement and size-exclusion chromatography in the same manner as in Example 9 (1), and it was confirmed that the object material was obtained.

(2) Synthesis of Conjugate (34) of Block Polymer Derivative (20) and GCSF

In the same manner as in Example 10 (1) except that block polymer derivative (20) was used as the starting material, and the gradient conditions during purification by cation exchange chromatography were those shown in Table 7, conjugate (34) of block polymer derivative (20) and GCSF was synthesized.

TABLE 7

| | time (min) | | | |
|---|---|---|---|---|
| | 0 | 10 | 70 | 75 |
| mobile phase B (%) | 2% | 2% | 100% | 2% |

For identification of the obtained conjugate (34) of block polymer derivative (20) and GCSF, the molecular weight was measured by MALDI-TOF-MS and analyzed by SDS-PAGE, circular dichroism measurement and size-exclusion chromatography in the same manner as in Example 9 (1), and it was confirmed that the object material was obtained.

(3) Synthesis of Conjugate (35) of Block Polymer Derivative (21) and GCSF In the same manner as in Example 10 (1) except that block polymer derivative (21) was used as the starting material, and the gradient conditions during purification by cation exchange chromatography were those shown in Table 8, conjugate (35) of block polymer derivative (21) and GCSF was synthesized.

TABLE 8

| | time (min) | | | |
|---|---|---|---|---|
| | 0 | 10 | 75 | 80 |
| mobile phase B (%) | 2% | 2% | 100% | 2% |

For identification of the obtained conjugate (35) of block polymer derivative (21) and GCSF, the molecular weight was measured by MALDI-TOF-MS and analyzed by SDS-PAGE, circular dichroism measurement and size-exclusion chromatography in the same manner as in Example 9 (1), and it was confirmed that the object material was obtained.

Comparative Example 1

Reaction of N Terminal of Granulocyte Colony Stimulating Factor (GCSF) and Methoxy PEG Derivative: Synthesis of Conjugate (36) of Methoxy PEG Aldehyde (Molecular Weight=20 kDa) and GCSF To a 10 mM sodium acetate buffer (pH=4.6, containing 5 (w/v)% sorbitol) containing 3 mg of GCSF was added methoxy PEG aldehyde ("SUNBRIGHT ME-200AL" manufactured by NOF CORPORATION, number average molecular weight=about 20 kDa) (3 equivalents), the GCSF concentration was adjusted to 3.0 mg/mL, and the mixture was stirred at 4° C. for 1 hr. Then, sodium cyanoborohydride (100 equivalents) which is a reducing agent was added, and the mixture was stirred at 4° C. for 24 hr. Furthermore, glycylglycine (100 equivalents) was added and the mixture was stirred at 4° C. for 1 hr to discontinue the reaction. Using RP-HPLC, analysis was performed and progress of the reaction was confirmed. The analysis conditions of RP-HPLC were the same as those in the above-mentioned Example 9 (1).

As a result of RP-HPLC analysis, the reaction rate after reaction for 24 hr was about 78%.

The obtained reaction mixture was dialyzed for 24 hr at room temperature (dialysis membrane: manufactured by Delchimica Scientific glassware (molecular weight cut off=3.5 kDa), outer liquid: 10 mM aqueous sodium phosphate solution (pH=4.7)), after which purified by cation exchange chromatography under the following purification conditions.

<Purification Conditions> column: TSKgel SP-5PW 10 μm column, 7.5×75 mm mobile phase A: 10 mM sodium phosphate, pH=4.7 mobile phase B: 100 mM sodium phosphate+100 mM sodium chloride, pH=4.85 flow rate: 1.0 mL/min detection wavelength: 280 nm gradient conditions: as shown in Table 9

TABLE 9

| | time (min) | | | | |
|---|---|---|---|---|---|
| | 0 | 5 | 65 | 90 | 95 |
| mobile phase B (%) | 5% | 5% | 100% | 100% | 5% |

A solution containing the object material fractionated by the above-mentioned cation exchange chromatography purification was concentrated by ultrafiltration (centrifugal ultrafiltration filter; "Amicon" (molecular weight cut off=10 kDa) 5000×g, 4° C.) and dialyzed for 24 hr at room temperature (dialysis membrane: manufactured by Delchimica Scientific glassware (molecular weight cut off=3.5 kDa), outer liquid: 10 mM sodium acetate buffer (pH=4.6, containing 5 (w/v)% sorbitol)). The GCSF concentration of the obtained solution was calculated by measuring the absorbance at 280 nm.

Figure 9:
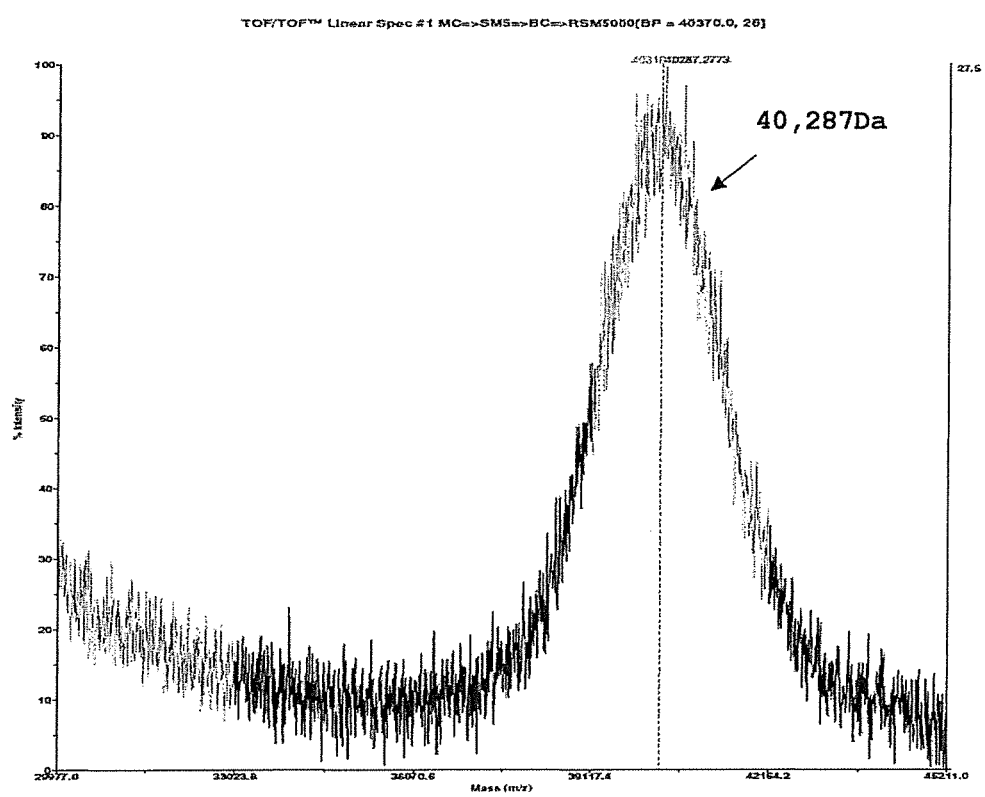
FIG. 9 shows the results of MALDI-TOF-MS analysis of methoxy PEG-GCSF conjugate (36) in Comparative Example 1.

For identification of obtained methoxy PEG-GCSF conjugate (36), the molecular weight was measured by MALDI-TOF-MS (FIG. 9) and analyzed by SDS-PAGE, circular dichroism measurement and size-exclusion chromatography in the same manner as in Example 9 (1), and it was confirmed that the object material was obtained.

Experimental Example 1

Evaluation of Pharmacokinetics in Animal Model

Using GCSF, conjugate (31) of block polymer derivative (26) and GCSF obtained in Example 9 (4), and methoxy PEG-GCSF conjugate (36) obtained in Comparative Example 1 and Sprague-Dawley rats (body weight 200 g-270 g), a pharmacokinetics test was performed (3 rats/group).

A GCSF sample was prepared using 200 μL of phosphate buffered saline (PBS) (pH=7.4) and filtered with a 0.22 μm filter. The prepared sample solution was injected from the tail vein (100 μg/kg as GCSF) and a blood sample was collected at any time before (t=0) or after the administration. All operations for the animal experiment were performed under anesthesia with isoflurane.

The blood sample was centrifuged (1500×g, 20 min), the content of GCSF contained in the obtained serum was measured by ELISA kit (manufactured by Invitrogen). The results were evaluated by the program 2.0 PK solver system using a 2-compartmental model, and the area under blood concentration curve (AUC) was compared (Table 10, FIG. 10).

TABLE 10

| sample | AUC 0-inf (ng/mL · h) |
|---|---|
| GCSF | 5744 |
| conjugate (31) | 33607 |
| conjugate (36) | 27869 |

Figure 10:
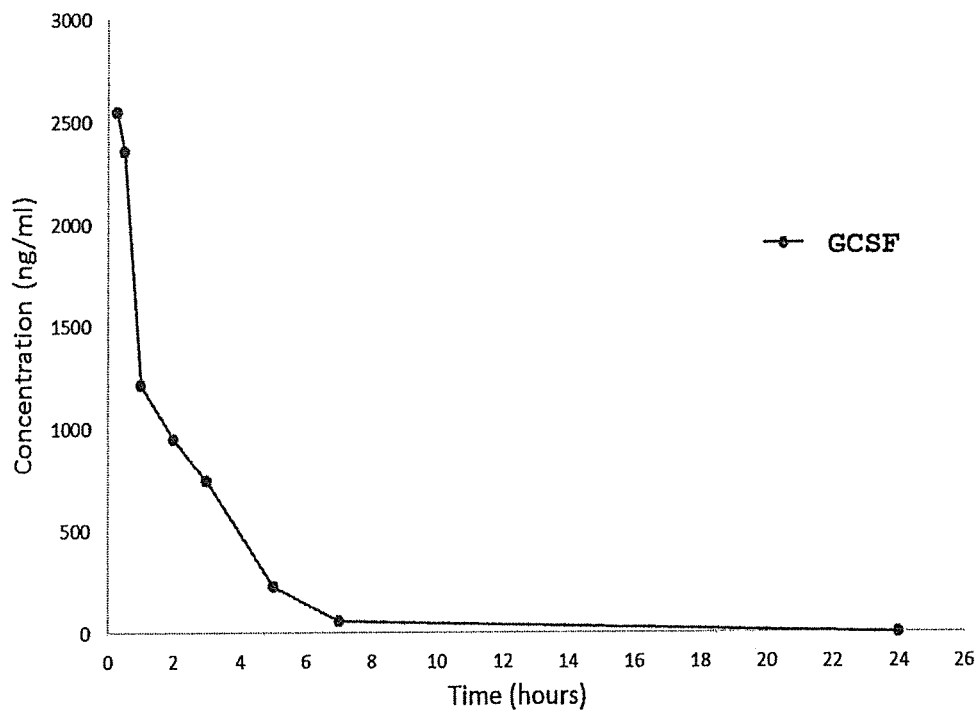
FIG. 10 shows the results of pharmacokinetic evaluation of GCSF, conjugate (31) of block polymer derivative (26) and GCSF, and methoxy PEG-GCSF conjugate (36) by using rats in Experimental Example 1.
Figure 10:
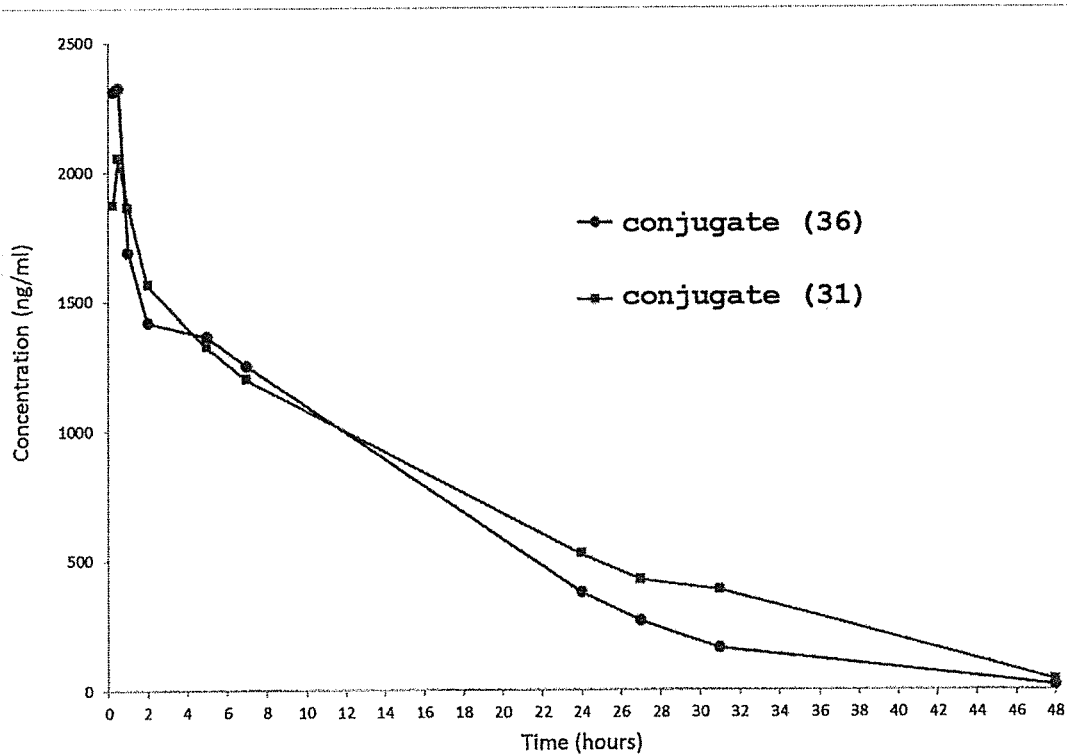

As shown in FIG. 10, GCSF mostly disappeared from the blood in 6 hours after administration ((A)), whereas conjugate (31) of block polymer derivative (26) and GCSF obtained in Example 9 (4) could significantly prolong blood retention property of GCSF ((B)). As shown in Table 10 and FIG. 10, it was confirmed that the blood retention property can be significantly improved as compared to methoxy PEG-GCSF conjugate (36) obtained in Comparative Example 1.

PEG moieties of conjugate (31) of block polymer derivative (26) and GCSF, and methoxy PEG-GCSF conjugate (36) have the same molecular weight (20 kDa). Thus, it was suggested that the improvement of blood retention property observed in conjugate (31) of block polymer derivative (26) and GCSF was caused by introduction of polyanionic polyglutamic acid (average degree of polymerization=9) into the PEG chain terminal.

Example 11

Figure 11:
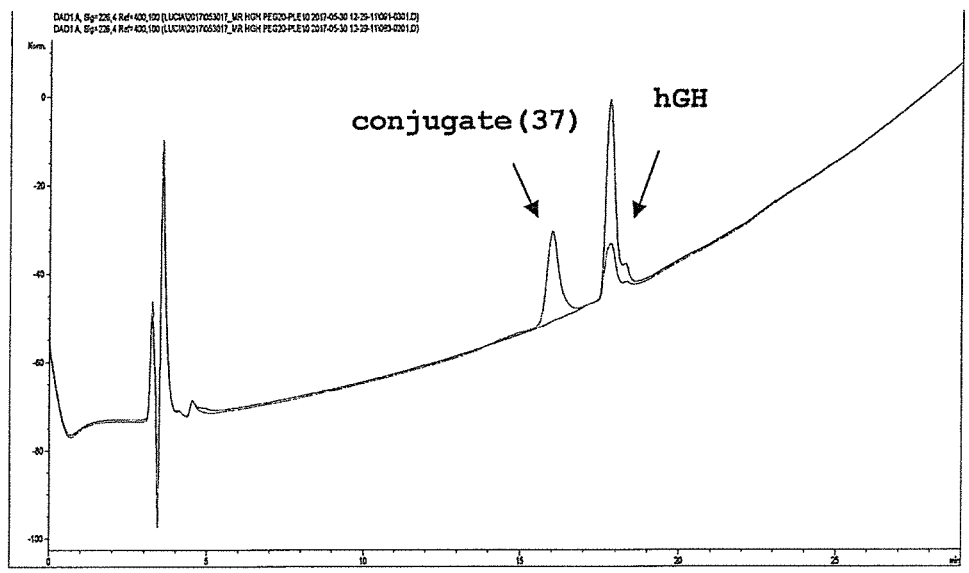
FIG. 11 shows the results of RP-HPLC analysis of a reaction mixture of conjugate (37) of block polymer derivative (26) and hGH in Example 11 (1).

Reaction of N Terminal of Human Growth Hormone (hGH) and Block Polymer Derivative (1) Synthesis of Conjugate (37) of Block Polymer Derivative (26) and hGH To a 100 mM sodium acetate buffer (pH=5.5) containing 2 mg of hGH (amino acid sequence: as shown below) (Shenandoah) was added 5 equivalents of block polymer derivative (26) obtained in Example 4 and having an aldehyde group, the hGH concentration was adjusted to 1.0 mg/mL, and the mixture was stirred at 4° C. for 1 hr. Then, sodium cyanoborohydride (50 equivalents) which is a reducing agent was added, and the mixture was stirred at 25° C. for 24 hr. Furthermore, glycylglycine (100 equivalents) was added and the mixture was stirred at 25° C. for 1 hr to discontinue the reaction. Using reversed-phase liquid chromatography (RP-HPLC), analysis was performed under the following conditions and progress of the reaction was confirmed as shown in FIG. 11.
<Amino Acid Sequence of hGH>

```
                                           (SEQ ID NO: 2)
MFPTIPLSRL  FDNAMLRAHR  LHQLAFDTYQ  EFEEAYIPKE

QKYSFLQNPQ  TSLCFSESIP  TPSNREETQQ  KSNLELLRIS

LLLIQSWLEP  VQFLRSVFAN  SLVYGASDSN  VYDLLKDLEE

GIQTLMGRLE  DGSPRTGQIF  KQTYSKFDTN  SHNDDALLKN

YGLLYCFRKD  MDKVETFLRI  VQCRSVEGSC  GF
```

<RP-HPLC Analysis Conditions>
  apparatus: "Agilent 1200 Infinity" manufactured by Agilent Technologies
  detector: UV (226 nm)
  column: Phenomenex Jupiter 5 μm C18 300 Å column, 4.6×250 mm
  mobile phase A: water+0.1 (v/v)% trifluoroacetic acid
  mobile phase B: acetonitrile+0.1 (v/v)% trifluoroacetic acid
  flow rate: 1 mL/min
  gradient conditions: as shown in Table 11

TABLE 11

| | time (min) | | | |
|---|---|---|---|---|
| | 0 | 25 | 27 | 29 |
| mobile phase B (%) | 40% | 70% | 90% | 40% |

As a result of RP-HPLC analysis, the reaction rate after reaction for 24 hr was about 64%.

Figure 12:
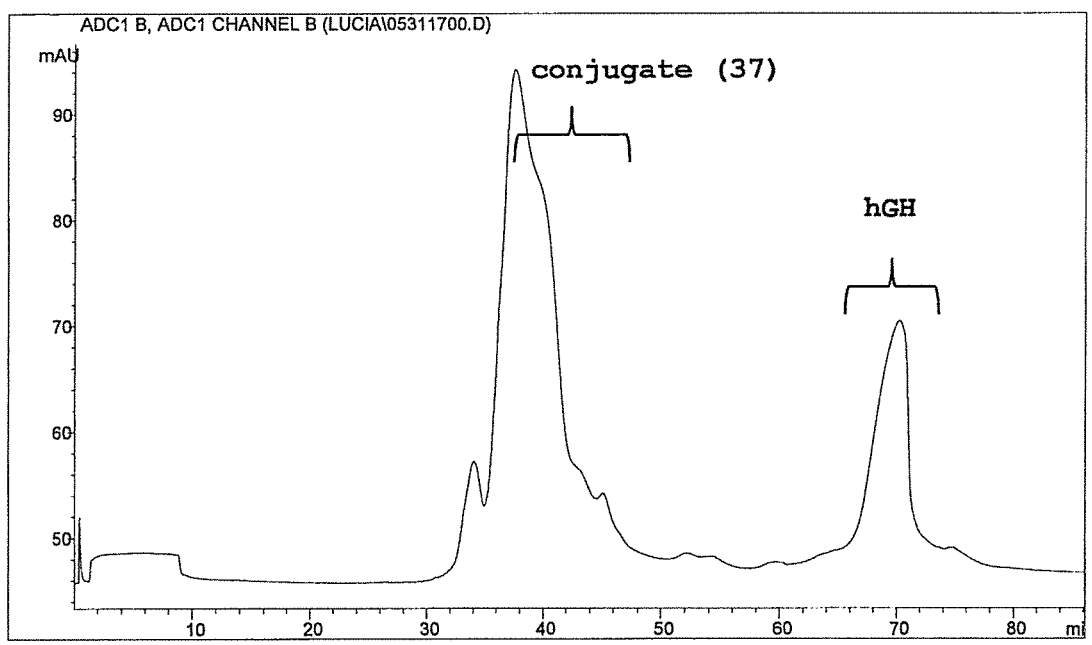
FIG. 12 shows the results of cation exchange chromatography purification of a reaction mixture of conjugate (37) of block polymer derivative (26) and hGH in Example 11 (1)

The obtained reaction mixture was dialyzed for 24 hr at room temperature (dialysis membrane: manufactured by Delchimica Scientific glassware (molecular weight cut off=3.5 kDa), outer liquid: 10 mM aqueous sodium acetate solution (pH=4.7)), after which purified by cation exchange chromatography under the following purification conditions and a fraction containing conjugate (37) shown in FIG. 12 was collected.
<Purification Conditions>
  column: TSKgel SP-STAT 7 μm column, 4.6×100 mm
  mobile phase A: 10 mM sodium acetate, pH=4.7
  mobile phase B: 10 mM sodium acetate+500 mM sodium chloride, pH=4.85
  flow rate: 0.7 mL/min
  detection wavelength: 280 nm
  gradient conditions: as shown in Table 12

TABLE 12

| | time (min) | | | | |
|---|---|---|---|---|---|
| | 0 | 10 | 75 | 75 | 80 |
| mobile phase B (%) | 5% | 5% | 60% | 100% | 5% |

A solution containing the object material fractionated by the above-mentioned ion exchange chromatography purification was concentrated by ultrafiltration (centrifugal ultrafiltration filter; "Amicon" (molecular weight cut off=10 kDa) 5000×g, 4° C.) and dialyzed for 24 hr at room temperature (dialysis membrane: manufactured by Delchimica Scientific glassware (molecular weight cut off=3.5 kDa), outer liquid: 10 mM sodium acetate buffer (pH=4.6, containing 5 (w/v)% sorbitol)). The hGH concentration of the obtained solution was calculated by measuring the absorbance at 280 nm.

For identification of the obtained conjugate (37) of block polymer derivative (26) and hGH, the molecular weight was measured by MALDI-TOF-MS and analyzed by SDS-PAGE, circular dichroism measurement and size-exclusion chromatography in the same manner as in Example 9 (1), and it was confirmed that the object material was obtained.

Figure 13:
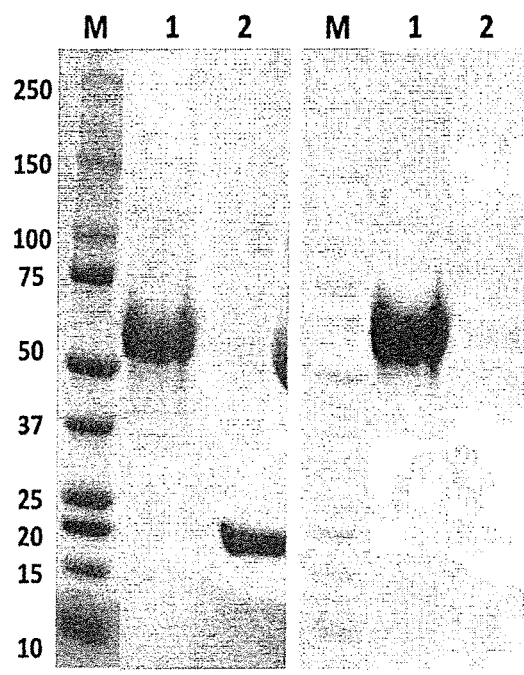
FIG. 13 shows the results of SDS-PAGE analysis of conjugate (37) of block polymer derivative (26) and hGH in Example 11 (1).

The analysis results by SDS-PAGE are shown in FIG. 13. In FIG. 13, lane M shows molecular weight marker, lane 1 shows conjugate (37) of block polymer derivative (26) and hGH, and lane 2 shows hGH.

The left Figure shows the results of protein detection by Coomassie Brilliant Blue staining and the right Figure shows the results of PEG detection by iodine staining.

In FIG. 13, both bands of protein and PEG were detected for conjugate (37) of block polymer derivative (26) and hGH (lane 1).

(2) Synthesis of Conjugate (38) of Block Polymer Derivative (27) and hGH

In the same manner as in Example 11 (1) except that block polymer derivative (27) was used as the starting material, conjugate (38) of block polymer derivative (27) and hGH was synthesized.

For identification of the obtained conjugate (38) of block polymer derivative (27) and hGH, the molecular weight was measured by MALDI-TOF-MS and analyzed by SDS-PAGE, circular dichroism measurement and size-exclusion chromatography in the same manner as in Example 11 (1), and it was confirmed that the object material was obtained.

Comparative Example 2

Figure 14:
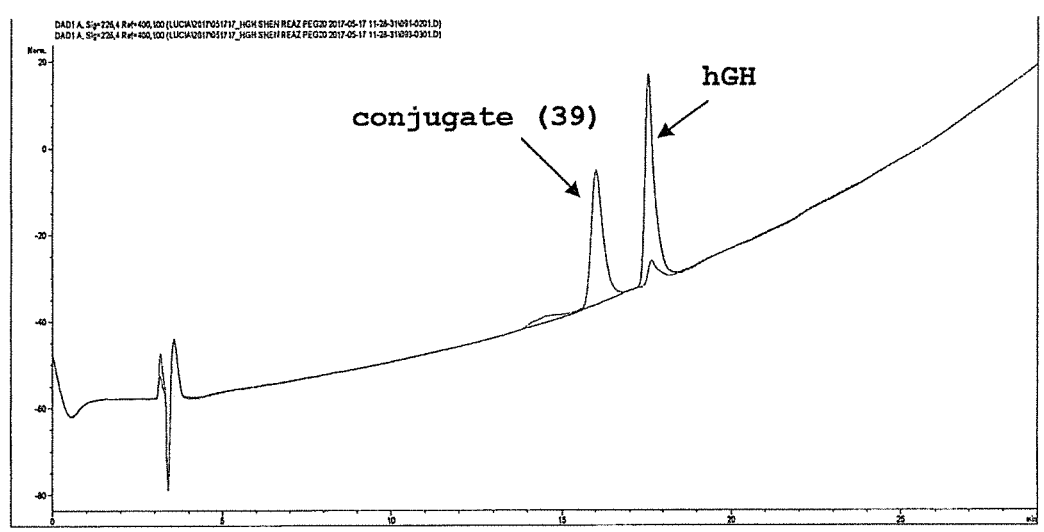
FIG. 14 shows the results of RP-HPLC analysis of a reaction mixture of methoxy PEG-hGH conjugate (39) in Comparative Example 2.

Reaction of N Terminal of Human Growth Hormone (hGH) and Methoxy PEG Derivative: Synthesis of Conjugate (39) of Methoxy PEG Aldehyde (Molecular Weight=20 kDa) and hGH In the same manner as in Example 11 (1) except that methoxy PEG aldehyde ("SUNBRIGHT ME-200AL" manufactured by NOF CORPORATION, number average molecular weight about=20 kDa) was used as the starting material, methoxy PEG-hGH conjugate (39) was synthesized. As a result of RP-HPLC analysis, the reaction rate after reaction for 24 hr was about 77% (FIG. 14).

For identification of the obtained methoxy PEG-hGH conjugate (39), the molecular weight was measured by MALDI-TOF-MS and analyzed by SDS-PAGE, circular dichroism measurement and size-exclusion chromatography in the same manner as in Example 11 (1), and it was confirmed that the object material was obtained.

Experimental Example 2

Pharmaceutical Evaluation of hGH in Hypophysectomized Rat

Pituitary gland-excised OVA rats (male, body weight=about 90 g) were purchased from Charles River Laboratories (Lecco, Italy). The rats were randomly divided into 6 groups (4 rats/group), and reared in an animal facility for 2 weeks before the experiment.

Figure 15:
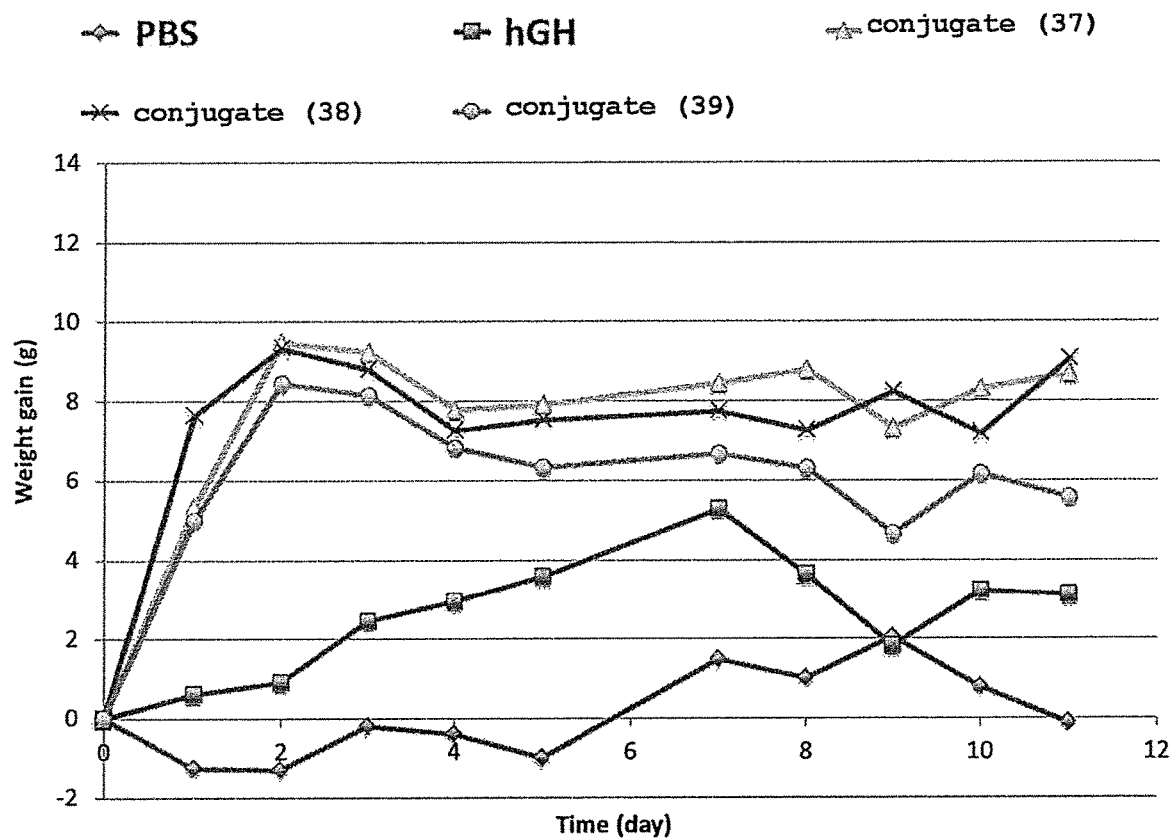
FIG. 15 shows the results of body weight measurement of the hypophysectomised rats of each group in Experimental Example 2.

PBS solution (200 µL) was administered from the tail vein in the PBS control group. In the hGH administration group, native hGH was administered from the tail vein for 6 days (0.3 mg/kg/day, about 27 µg/rat/day, total about 162 µg/rat). For a group administered with conjugate (37) of block polymer derivative (26) and hGH, which was obtained in Example 11 (1), a group administered with conjugate (38) of block polymer derivative (27) and hGH, which was obtained in Example 11 (2), and a group administered with methoxy PEG-hGH conjugate (39) obtained in Comparative Example 2, each conjugate was dissolved in PBS and administered (1.8 mg/kg, about 162 µg/rat) from the tail vein by single administration. The rats were monitored and measured for body weight for 11 days at the same time of day. The results are shown in FIG. 15. In addition, the tibial length of each rat was measured for 11 days, and the tibial length gain adjusted by initial body weight of the rats is shown in FIG. 16.

Figure 16:
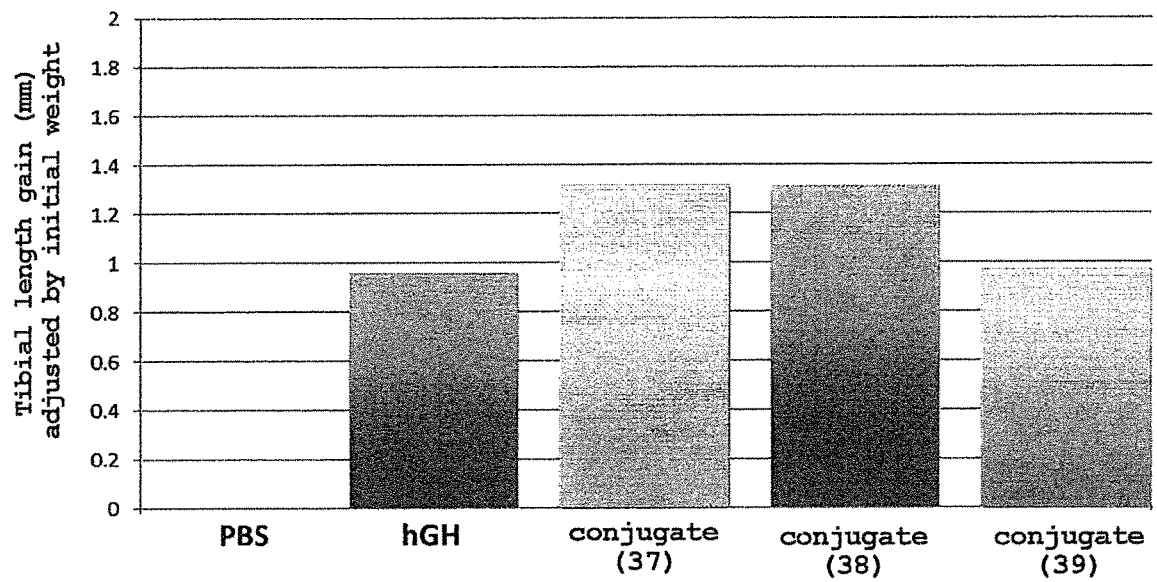
FIG. 16 shows tibial length gain adjusted by initial body weight of the hypophysectomised rats of each group in Experimental Example 2.

As shown in FIGS. 15 and 16, it was observed that body weight gain and tibial elongation were large in the group administered with conjugate (37) of block polymer derivative (26) and hGH, and the group administered with conjugate (38) of block polymer derivative (27) and hGH, as compared to the group administered with hGH, and the efficacy of hGH was significantly improved and prolonged. In addition, it was found that a high body weight-increasing effect and a tibial elongation effect could be achieved as compared to a group administered with methoxy PEG-hGH conjugate (39) having PEG with the same molecular weight (20 kDa) as that of PEG contained in conjugate (37) or conjugate (38).

INDUSTRIAL APPLICABILITY

As mentioned above, the present invention can provide a modified bio-related substance, in which the bio-related substance is conjugated to an anionic block polymer derivative, and can prolong half-life in blood of the bio-related substance and improve stability of the bio-related substance in the blood of living organisms.

The invention claimed is:

1. A conjugate of a block polymer and a bio-related substance, which is represented by the following formula (1):

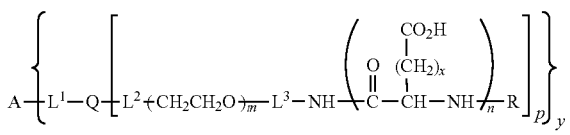

formula (1)

wherein A is a bio-related substance selected from the group consisting of a cytokine, a hormone, an enzyme, an antibody, and a nucleic acid, $L^1$, $L^2$, $L^3$ are each independently a single bond or a divalent linker, Q is a residue of a compound having 2 or 3 active hydrogens, m is 10-1400, n is 2-100, x is 1 or 2, R is a hydrogen atom or an acyl group, p is 1 or 2, and y is 1-40.

2. The conjugate according to claim 1, wherein, in the formula (1), y is 1.

3. The conjugate according to claim 2, wherein, in the formula (1), m is 40-1200 and n is 5-50.

4. The conjugate according to claim 3, wherein, in the formula (1), Q is a residue of a compound selected from the group consisting of ethylene glycol, glycerol, lysine, aspartic acid and glutamic acid.

5. The conjugate according to claim 4, wherein, in the formula (1), $L^1$, $L^2$, $L^3$ are each independently selected from the group consisting of a single bond, a phenylene group, an amide bond, an ether bond, a thioether bond, a urethane bond, a secondary amino group, a carbonyl group, a urea bond, a triazine group, a maleimide group added with thiol, an oxyme bond, and an alkylene group optionally containing one or more kinds selected from the group consisting of a single bond, a phenylene group, an amide bond, an ether bond, a thioether bond, a urethane bond, a secondary amino group, a carbonyl group, a urea bond, a triazine group, a maleimide group added with thiol and an oxyme bond.

6. The conjugate according to claim 2, wherein, in the formula (1), Q is a residue of a compound selected from the group consisting of ethylene glycol, glycerol, lysine, aspartic acid and glutamic acid.

7. The conjugate according to claim 2, wherein, in the formula (1), $L^1, L^2, L^3$ are each independently selected from the group consisting of a single bond, a phenylene group, an amide bond, an ether bond, a thioether bond, a urethane bond, a secondary amino group, a carbonyl group, a urea bond, a triazine group, a maleimide group added with thiol, an oxyme bond, and an alkylene group optionally containing one or more kinds selected from the group consisting of a single bond, a phenylene group, an amide bond, an ether bond, a thioether bond, a urethane bond, a secondary amino group, a carbonyl group, a urea bond, a triazine group, a maleimide group added with thiol and an oxyme bond.

8. The conjugate according to claim 1, wherein, in the formula (1), m is 40-1200 and n is 5-50.

9. The conjugate according to claim 1, wherein, in the formula (1), Q is a residue of a compound selected from the group consisting of ethylene glycol, glycerol, lysine, aspartic acid and glutamic acid.

10. The conjugate according to claim 1, wherein, in the formula (1), $L^1, L^2, L^3$ are each independently selected from the group consisting of a single bond, a phenylene group, an amide bond, an ether bond, a thioether bond, a urethane bond, a secondary amino group, a carbonyl group, a urea bond, a triazine group, a maleimide group added with thiol, an oxyme bond, and an alkylene group optionally containing one or more kinds selected from the group consisting of a single bond, a phenylene group, an amide bond, an ether bond, a thioether bond, a urethane bond, a secondary amino group, a carbonyl group, a urea bond, a triazine group, a maleimide group added with thiol and an oxyme bond.

\* \* \* \* \*

SEQUENCE LISTING

```
<160> NUMBER OF SEQ ID NOS: 2

<210> SEQ ID NO 1
<211> LENGTH: 174
<212> TYPE: PRT
<213> ORGANISM: Artificial Sequence
<220> FEATURE:
<223> OTHER INFORMATION: Synthetic Sequence

<400> SEQUENCE: 1

Thr Pro Leu Gly Pro Ala Ser Ser Leu Pro Gln Ser Phe Leu Leu Lys
1               5                   10                  15

Cys Leu Glu Gln Val Arg Lys Ile Gln Gly Asp Gly Ala Ala Leu Gln
            20                  25                  30

Glu Lys Leu Cys Ala Thr Tyr Lys Leu Cys His Pro Glu Glu Leu Val
        35                  40                  45

Leu Leu Gly His Ser Leu Gly Ile Pro Trp Ala Pro Leu Ser Ser Cys
    50                  55                  60

Pro Ser Gln Ala Leu Gln Leu Ala Gly Cys Leu Ser Gln Leu His Ser
65                  70                  75                  80

Gly Leu Phe Leu Tyr Gln Gly Leu Leu Gln Ala Leu Glu Gly Ile Ser
                85                  90                  95

Pro Glu Leu Gly Pro Thr Leu Asp Thr Leu Gln Leu Asp Val Ala Asp
            100                 105                 110
```

```
Phe Ala Thr Thr Ile Trp Gln Gln Met Glu Glu Leu Gly Met Ala Pro
            115                 120                 125

Ala Leu Gln Pro Thr Gln Gly Ala Met Pro Ala Phe Ala Ser Ala Phe
        130                 135                 140

Gln Arg Arg Ala Gly Gly Val Leu Val Ala Ser His Leu Gln Ser Phe
145                 150                 155                 160

Leu Glu Val Ser Tyr Arg Val Leu Arg His Leu Ala Gln Pro
                165                 170

<210> SEQ ID NO 2
<211> LENGTH: 192
<212> TYPE: PRT
<213> ORGANISM: Artificial Sequence
<220> FEATURE:
<223> OTHER INFORMATION: Synthetic Sequence

<400> SEQUENCE: 2

Met Phe Pro Thr Ile Pro Leu Ser Arg Leu Phe Asp Asn Ala Met Leu
1               5                   10                  15

Arg Ala His Arg Leu His Gln Leu Ala Phe Asp Thr Tyr Gln Glu Phe
            20                  25                  30

Glu Glu Ala Tyr Ile Pro Lys Glu Gln Lys Tyr Ser Phe Leu Gln Asn
        35                  40                  45

Pro Gln Thr Ser Leu Cys Phe Ser Glu Ser Ile Pro Thr Pro Ser Asn
    50                  55                  60

Arg Glu Glu Thr Gln Gln Lys Ser Asn Leu Glu Leu Leu Arg Ile Ser
65                  70                  75                  80

Leu Leu Leu Ile Gln Ser Trp Leu Glu Pro Val Gln Phe Leu Arg Ser
                85                  90                  95

Val Phe Ala Asn Ser Leu Val Tyr Gly Ala Ser Asp Ser Asn Val Tyr
            100                 105                 110

Asp Leu Leu Lys Asp Leu Glu Glu Gly Ile Gln Thr Leu Met Gly Arg
        115                 120                 125

Leu Glu Asp Gly Ser Pro Arg Thr Gly Gln Ile Phe Lys Gln Thr Tyr
    130                 135                 140

Ser Lys Phe Asp Thr Asn Ser His Asn Asp Asp Ala Leu Leu Lys Asn
145                 150                 155                 160

Tyr Gly Leu Leu Tyr Cys Phe Arg Lys Asp Met Asp Lys Val Glu Thr
                165                 170                 175

Phe Leu Arg Ile Val Gln Cys Arg Ser Val Glu Gly Ser Cys Gly Phe
            180                 185                 190
```